US008164944B2

(12) United States Patent
Nagumo

(10) Patent No.: US 8,164,944 B2
(45) Date of Patent: Apr. 24, 2012

(54) DRIVER CIRCUIT AND IMAGE FORMING APPARATUS

(75) Inventor: Akira Nagumo, Gunma (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 12/801,932

(22) Filed: Jul. 2, 2010

(65) Prior Publication Data

US 2011/0001520 A1 Jan. 6, 2011

(30) Foreign Application Priority Data

Jul. 6, 2009 (JP) ................................. 2009-159919

(51) Int. Cl.
*G11C 11/00* (2006.01)
*G11C 5/14* (2006.01)
(52) U.S. Cl. .................... 365/154; 365/156; 365/189.09
(58) Field of Classification Search .................... 365/154
See application file for complete search history.

(56) References Cited

U.S. PATENT DOCUMENTS

| 4,901,284 A | * | 2/1990 | Ochii et al. .................... 365/226 |
| 5,214,327 A | * | 5/1993 | Saeki et al. ....................... 326/38 |
| 5,990,920 A | * | 11/1999 | Nagumo et al. ............. 347/237 |
| 6,057,704 A | * | 5/2000 | New et al. ......................... 326/38 |
| 6,205,049 B1 | * | 3/2001 | Lien et al. ..................... 365/154 |
| 6,388,695 B1 | * | 5/2002 | Nagumo ....................... 347/237 |
| 6,549,453 B2 | * | 4/2003 | Wong ............................. 365/156 |
| 7,176,864 B2 | * | 2/2007 | Moriyama et al. ............... 345/87 |
| 7,440,313 B2 | * | 10/2008 | Abeln et al. ................. 365/154 |
| 7,577,014 B2 | * | 8/2009 | Yamagami ................... 365/154 |
| 7,609,541 B2 | * | 10/2009 | Burnett et al. ................ 365/154 |
| 7,613,031 B2 | * | 11/2009 | Hanafi et al. ................. 365/154 |
| 7,715,223 B2 | * | 5/2010 | Maeda et al. ................. 365/154 |
| 7,806,501 B2 | * | 10/2010 | Nagumo ......................... 347/19 |
| 7,869,261 B2 | * | 1/2011 | Ozawa ......................... 365/154 |
| 7,969,400 B2 | * | 6/2011 | Aoki et al. ..................... 345/98 |
| 2007/0025162 A1 | * | 2/2007 | Deng et al. ............... 365/189.09 |

FOREIGN PATENT DOCUMENTS

JP 09-109459 A 4/1997
JP 2003-063062 A 3/2003

* cited by examiner

*Primary Examiner* — Son Mai
(74) *Attorney, Agent, or Firm* — Rabin & Berdo, P.C.

(57) ABSTRACT

A driver circuit includes a memory cell for storing data and a data switching circuit. The memory cell includes a first inverter having a first output terminal and a first input terminal and a second inverter having a second output terminal and a second input terminal. The first output terminal is connected to the second input terminal and the second output terminal is connected to the first input terminal. A switch is connected to the first input terminal so that the data is fed to the memory cell through the switch. A voltage shifter supplies a first supply voltage to the first inverter and second inverter while the data is being written into the memory cell and a second supply voltage to the first inverter and second inverter after the data has been written into the memory cell.

12 Claims, 26 Drawing Sheets

MULTIPLEXER 161

CONTROLLING CIRCUIT 142

CONTROL VOLTAGE GENERATOR 170

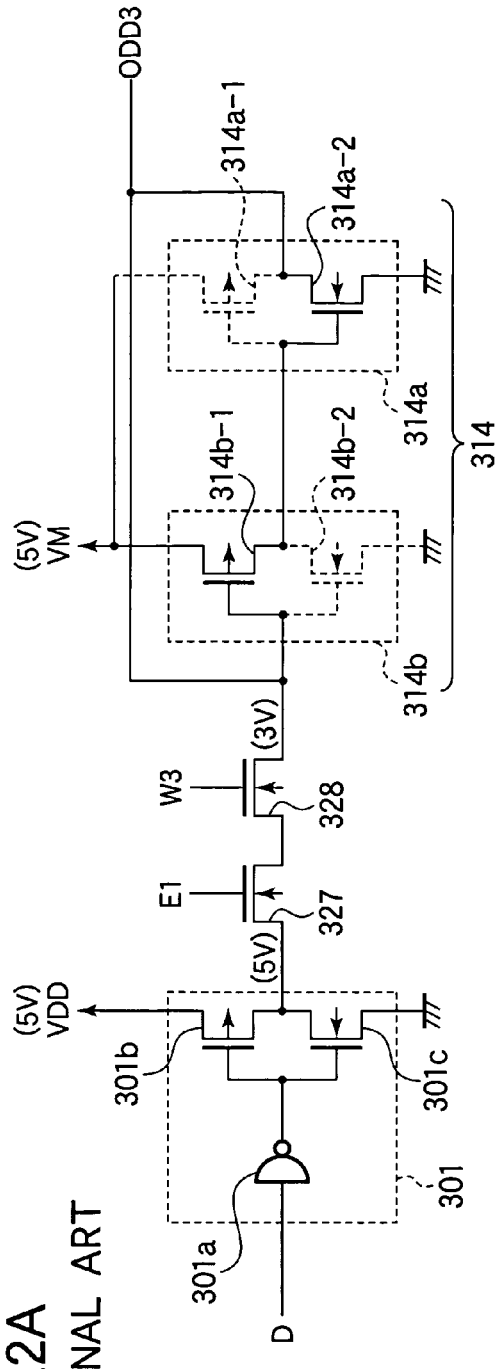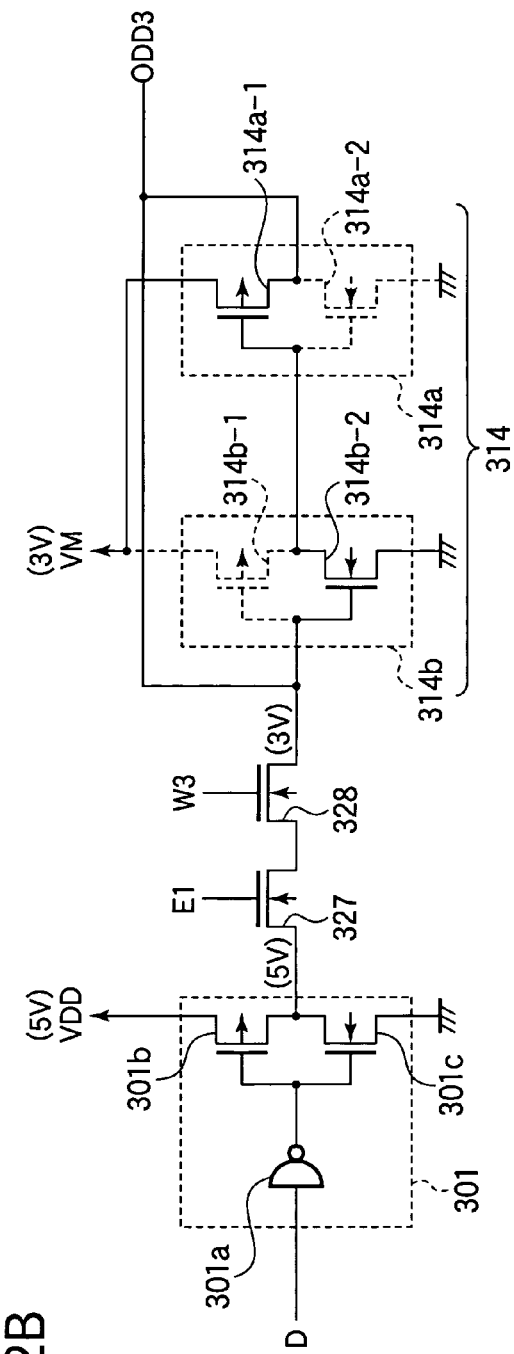
FIG.22A
CONVENTIONAL ART
FIG.22B

DRIVER CIRCUIT AND IMAGE FORMING APPARATUS

BACKGROUND OF THE INVENTION

1. Field of the Invention

The present invention relates to a driver circuit for driving a row of light emitting elements (e.g., LEDs) built in an electrophotographic printer, a row of heat generating elements built in a thermal printer, or a row of display elements built in a display apparatus, so that the elements are energized selectively and cyclically.

2. Description of the Related Art

For example, Japanese Patent Application Laid-Open No. H09-109459 discloses an electrophotographic printer incorporating an exposing unit in which a large number of light emitting elements are arranged. The light emitting elements may include LEDs, organic electroluminescence (EL) devices, and light emitting thyristors.

For an exposing unit based on LEDs, a single driver circuit a corresponding LED or selectively drives a plurality of LEDs, so that an LED emits light if current flows from anode to cathode of the LED. The light output of an LED depends on the amount of current flowing through the LED. Controlling the amount of current enables adjustment of the light output—hence exposure energy.

LEDs are commonly formed of compound semiconductors. Crystal defects of the compound semiconductor cause variation of output light of the LEDs, which in turn causes variation in print density of individual dots formed by the LEDs. One known method of correcting the variations in print density of individual dots is as follows: Dot compensation data for correcting the variations in the light output of LEDs is previously stored in a memory, and the individual LEDs are driven in accordance with the dot compensation data, thereby minimizing the variations in print density.

The memory is configured to have two bit lines just as the memory cells in a random access memory (SRAM). Data having opposite logic levels are applied to the two bit lines, thereby writing data into each cell. The driver ICs drive a plurality of groups of LEDs so that each group is driven at different timings from others while at the same time dynamically reading the data from the memory.

However, driver circuits that employ the aforementioned existing memory may suffer from the following drawbacks.

The bit lines used for writing data into the memory cells require switching elements for enabling writing of data at different timings. This increases the number of required elements which in turn increases circuit complexity, being an obstacle to cost reduction of the memory. One known way of solving this drawback is to employ a single bit line instead of two bit lines, but is insufficient in that the memory does not properly operate when the supply voltage decreases.

SUMMARY OF THE INVENTION

The present invention was made to solve the aforementioned drawbacks.

A driver circuit includes a memory cell for storing data and a data switching circuit. The memory cell includes a first inverter having a first output terminal and a first input terminal and a second inverter having a second output terminal and a second input terminal. The first output terminal is connected to the second input terminal and the second output terminal is connected to the first input terminal. A switch is connected to the first input terminal so that the data is fed to the memory cell through the switch. A voltage shifter supplies a first supply voltage to the first inverter and second inverter while the data is being written into the memory cell and a second supply voltage to the first inverter and second inverter after the data has been written into the memory cell.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein:

FIG. 22A illustrates a pertinent portion of the conventional configuration;

FIG. 22B illustrates the configuration of the first embodiment shown in FIG. 19;

DETAILED DESCRIPTION OF THE INVENTION

First Embodiment

Figure 1:
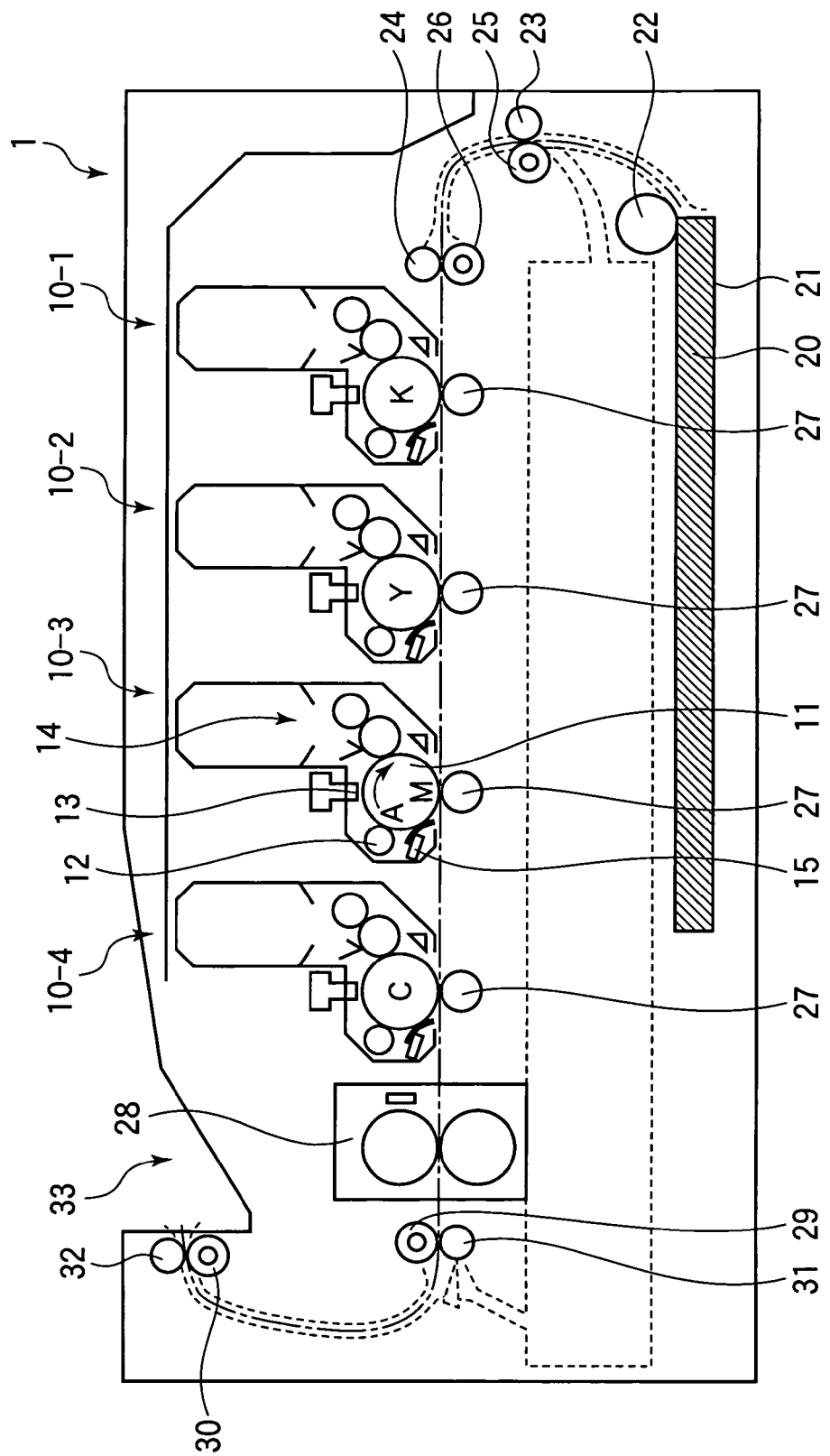
FIG. 1 illustrates a general configuration of an image forming apparatus according to a first embodiment.

FIG. 1 illustrates a general configuration of an image forming apparatus 1 according to a first embodiment.

The image forming apparatus 1 is an electrophotographic printer that employs an optical head (e.g., LED head) based on light emitting elements (e.g., LEDs). Each of the process units 10-1 to 10-4 may be substantially identical; for simplicity only the operation of the process unit 10-3 for forming magenta images will be described, it being understood that the other process units may work in a similar fashion.

The process unit 10-3 is oriented so that the photoconductive drum 11 is rotatable in a direction shown by arrow A in FIG. 1. A charging unit 12, an LED head 13 as an exposing unit, a developing unit 14, and a cleaning unit 15 are disposed around the photoconductive drum 11. The charging unit 12 charges the surface of the photoconductive drum 11. The LED head 13 irradiates the charged surface of the photoconductive drum 11 with light to form an electrostatic latent image. The developing unit 14 supplies the magenta toner to the photoconductive drum 11, thereby developing the electrostatic latent image with the magenta toner into a visible image. The cleaning unit 15 removes the residual toner from the photoconductive drum 11 after transferring the visible image onto a print medium. The photoconductive drum 11 and rollers in the respective process units 10-1 to 10-4 are driven in rotation by a drive source (not shown) via gears or the like.

A paper cassette 21 is attached to a lower end portion of the image forming apparatus 1, and holds a stack of paper 20. A hopping roller 22 is disposed over the paper cassette 21. A transporting roller 25 and a registry roller 26 are disposed downstream of the hopping roller 22 with respect to the transport path of the paper 20. The transporting roller 25 and the registry roller 26 cooperate with a pinch roller 23 and a pinch roller 24, respectively, to hold the paper 20 in a sandwiched relation, and transport the paper 20 to the process units. The registry roller 26 corrects skew of the paper 20 before the paper 20 is fed to the process unit 10-1. The hopping roller 22, transporting roller 25, and registry roller 26 are driven in rotation by a drive source (not shown) via gears or the like.

Transfer units 27 are formed of a semi-conductive rubber material, and face the process units 10-1 to 10-4, respectively. A voltage is applied to the transfer units 27 in order to develop a potential difference between the surface of each photoconductive drum 11 and a corresponding transfer unit 27 when the toner image is transferred from the photoconductive drum 11 onto the paper 20.

A fixing unit 28 is located downstream of the process unit 10-4. The fixing unit 28 includes a heat roller and a back up roller, the heat roller incorporating a heater element therein. The fixing unit 28 fuses the toner image on the paper 20 under pressure and heat. Discharge rollers 29 and 30, pinch rollers 31 and 32, and a stacker 33 are located downstream of the fixing unit 28. The discharge rollers 29 and 30 cooperate with the pinch rollers 31 and 32, respectively, to hold the paper 20 in a sandwiched relation, transporting the paper 20 to the stacker 33. The fixing unit 28 and discharge rollers 29 are driven in rotation by a drive source (not shown) via gears of the like.

The image forming apparatus 1 of the aforementioned configuration operates in the following manner. The hopping roller 22 feeds the paper 20 on a sheet-by-sheet basis from the stack of the paper 20 held in the paper cassette 21. The paper 20 is held in a sandwiched relation by the transfer roller 25, registry roller 26, pinch rollers 23 and 24, and is transported through the gap between the photoconductive drum 11 of the process unit 10-1 and the transfer unit 27. The toner image is transferred onto the paper 20 while the paper 20 passes through the gap. Likewise, the paper 20 passes through the gap between the process units 10-2 to 10-4 and the corresponding transfer units 27, so that the toner images of corresponding colors are transferred onto the paper 20 in registration.

In this manner, the toner images of the respective colors are transferred onto the paper 20 one on top of the other, and then fixed by the fixing unit 28. The paper 20 is then further transported by the discharge rollers 29 and 30 and the pinch rollers 31 and 32 to the stacker 33. This completes printing of one page of paper 20.

{LED Head}

Figure 2:
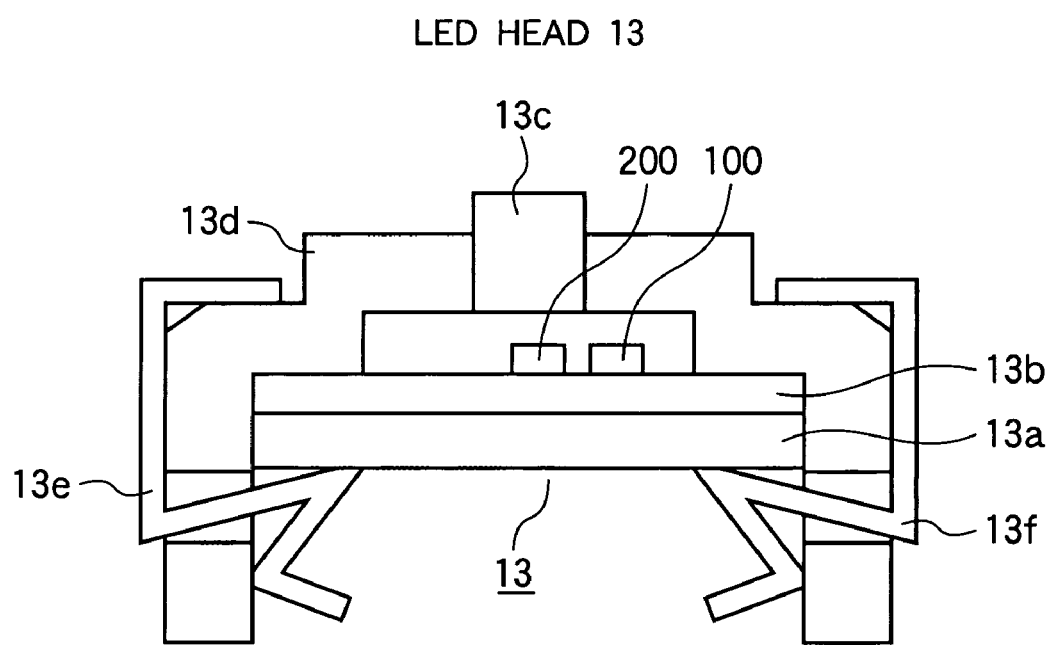
FIG. 2 is a cross-sectional view of the LED head shown in FIG. 1.

FIG. 2 is a cross-sectional view of the LED head 13 shown in FIG. 1.

The LED head 13 includes a base member 13a and a printed circuit board 13b fixed to the base member 13a. The printed circuit board 13b carries thereon a plurality of driver ICs 100 and a plurality of LED arrays 200, all of which are in a chip level and are fixed to the printed circuit board by means of a thermosetting resin. The driver ICs 100 and LED arrays 200 are interconnected by means of bonding wires. A rod lens array 13c includes a plurality of rod-shaped optical elements and is located over the LED array 200. The rod lens array 13c is securely mounted on a holder 13d. The base member 13a, printed circuit board 13b, and holder 13d are clamped together with clamping members 13e and 13f.

{Printer Controlling System}

Figure 3:
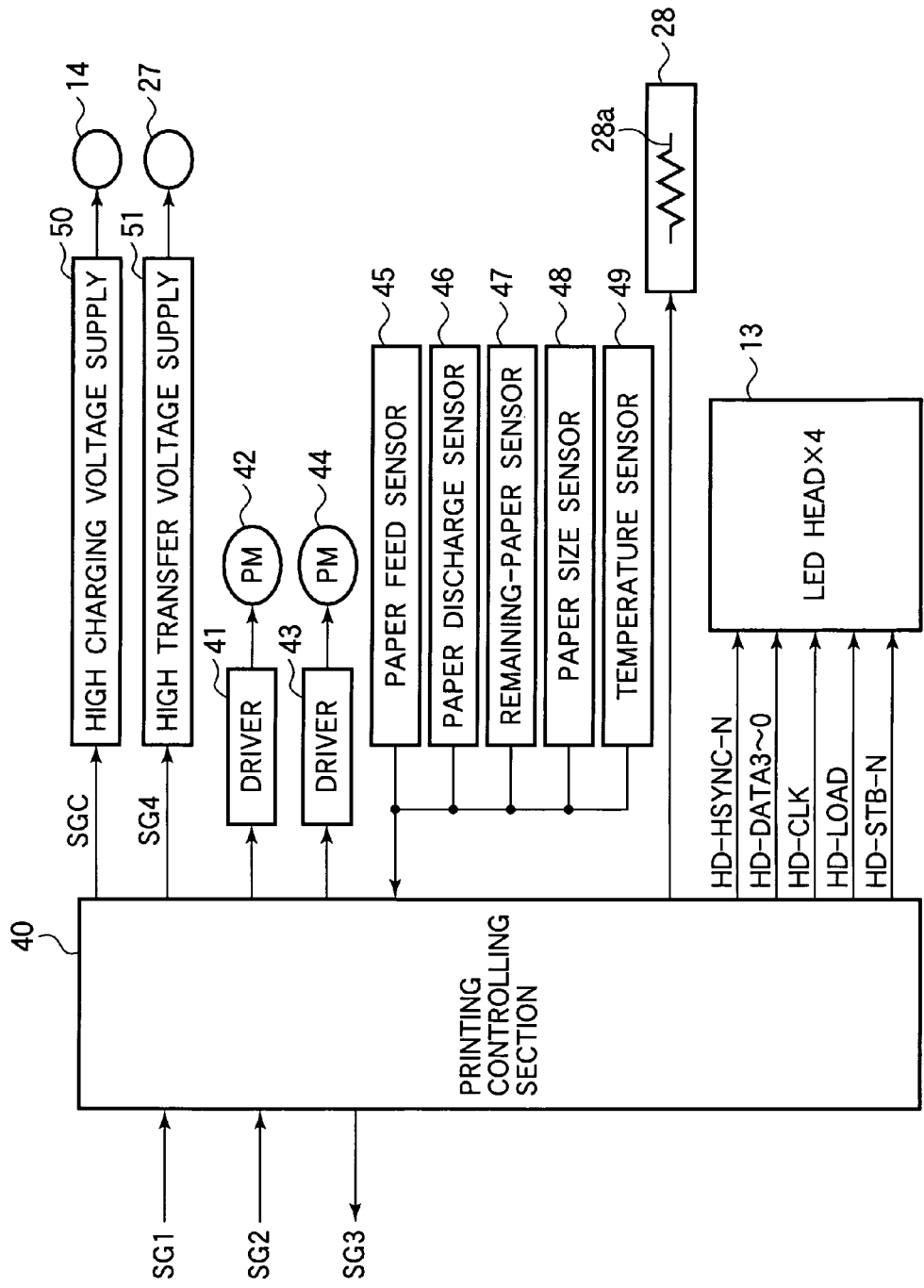
FIG. 3 is a block diagram illustrating a printer controlling system for the image forming apparatus.

FIG. 3 is a block diagram illustrating a printer controlling system for the image forming apparatus 1.

The printer controlling system includes a printing controller 40 disposed within a print engine of the image forming apparatus 1. The printing controller 40 mainly includes a microprocessor, a read only memory (ROM), a random access memory (RAM), and an I/O port for inputting and outputting signals, and a timer. The printing controller 40 controls the sequence of a printing operation of the image forming apparatus 1 in accordance with a control signal SG1 and a video signal (i.e., bit map data) SG2 received from an image processing section (not shown). The printing controller 40 is connected to the LED heads 13 of the process units 10-1 to 10-4, a heater element 28a of the fixing unit 28, drivers 41 and 43, a paper feed sensor 45, a paper discharge sensor 46, a remaining-paper sensor 47, a paper size sensor 48, a temperature sensor 49 of the fixing unit 28, a high charging voltage supply 50, and a high transfer voltage supply 51. The driver 41 is connected to a developing/transferring process motor (PM) 42. The driver 43 is connected to a paper transporting motor (PM) 44. The high charging voltage supply 50 is connected to the developing unit 14. The high transfer voltage supply is connected to the transfer unit 27.

The printer controlling system of the aforementioned configuration will operate as follows: Upon reception of the control signal SG1 from the image processing section, the printing controller 40 makes a decision to determine whether the temperature of the heat roller detected by the temperature sensor 49 is within a usable range. If the temperature is lower than a lower end of a predetermined range, the heater 28a is energized to heat the heat roller until the temperature of the heat roller is within the range. The printing controller 40 then drives the driver 41 to rotate the developing/transferring process motor (PM) 42, while also outputting a charge signal SGC to turn on the high charging voltage supply 50 for charging the developing section 14.

The remaining-paper sensor 47 then detects the presence and absence of the paper 20 held in the paper cassette and the paper size sensor 48 detects the size of the paper 20, so that an appropriate type of paper 20 may be fed into the transport path. The paper transporting motor 44 is adapted to rotate either in a forward direction or in a reverse direction depending on a control signal. The paper transporting motor 44 is first rotated in the reverse direction until the paper feed sensor 45 detects the paper 20, and is then rotated in the forward direction to transport the paper 20 into the print engine.

When the paper 20 arrives at a printing position, the printing controller 40 sends a timing signal SG3 (including a main scanning sync signal and a sub scanning sync signal) to the image processing section, and receives the video signal SG2 from the image processing section. The image processing section edits the video signal SG2 on a page-by-page basis to produce print data signals HD-DATA3 to HD-DATA0, and sends the print data signals HD-DATA3 to HD-DATA0 to corresponding LED heads 13. Each LED head 13 includes a row of a plurality of LEDs, each LED corresponding to a single dot (i.e., pixel) to be formed on the photoconductive drum 11.

Upon reception of the video signal SG2 for one line of an image, the printing controller 40 sends a latch signal HD-LOAD to the respective LED heads 13 so that the respective LED heads 13 hold the corresponding print data signals HD-DATA. The printing controller 40 is configured to drive the respective LED heads 13 to print the print data signals HD-DATA3 to HD-DATA0 while at the same time receiving the video signal SG2 for the next print line from the image processing section.

The printing controller 40 provides a clock signal HD-CLK, a main scanning synch signal HD-HSYNC-N, and a print drive signal HD-STB-N to each of the LED heads 13. The clock signal HD-CLK is used to send the print data signals HD-DATA3 to HD-DATA0 to the respective LED heads 13.

The video signal SG2 is communicated on a line-by-line between the printing controller 40 and the image processing section. Each LED head 13 illuminates the negatively charged, surface of the photoconductive drum 11 to dissipate the charges, thereby forming an invisible image (i.e., electrostatic latent image). The negatively charged toner is supplied from the developing unit 14 to the respective dots of the electrostatic latent image by electrostatic force, thereby forming a toner image.

The toner image is then carried to the transfer unit 27. Upon reception of a transfer signal SG4, a transfer voltage supply 51 turns on, so that when the paper 20 passes through the gap between the photoconductive drum 11 and the transfer unit 27, the toner image is transferred onto the paper 20. The paper 20 carrying the toner image thereon passes through the fixing unit 28 in which the toner image is fused into a permanent image. After fixing, the paper 20 is further transported from the fixing unit 28, passing the discharge sensor 46 to the stacker 33.

In response to the detection outputs of the paper feed sensor 45 and paper size sensor 48, the printing controller 40 turns on the high transfer voltage supply 51 to apply a voltage to the transfer unit 27 while the paper 20 passes the transfer section 27. When the paper 20 has passed the paper discharge sensor 46, the printing controller 40 turns off the high charging voltage supply 50, thereby terminating supply of the voltage to the developing section 14 causing the developing/transferring process motor (PM) 42 to stop. The above described processing is repeated for each page of the paper 20.

{LED Head}

Figure 4:
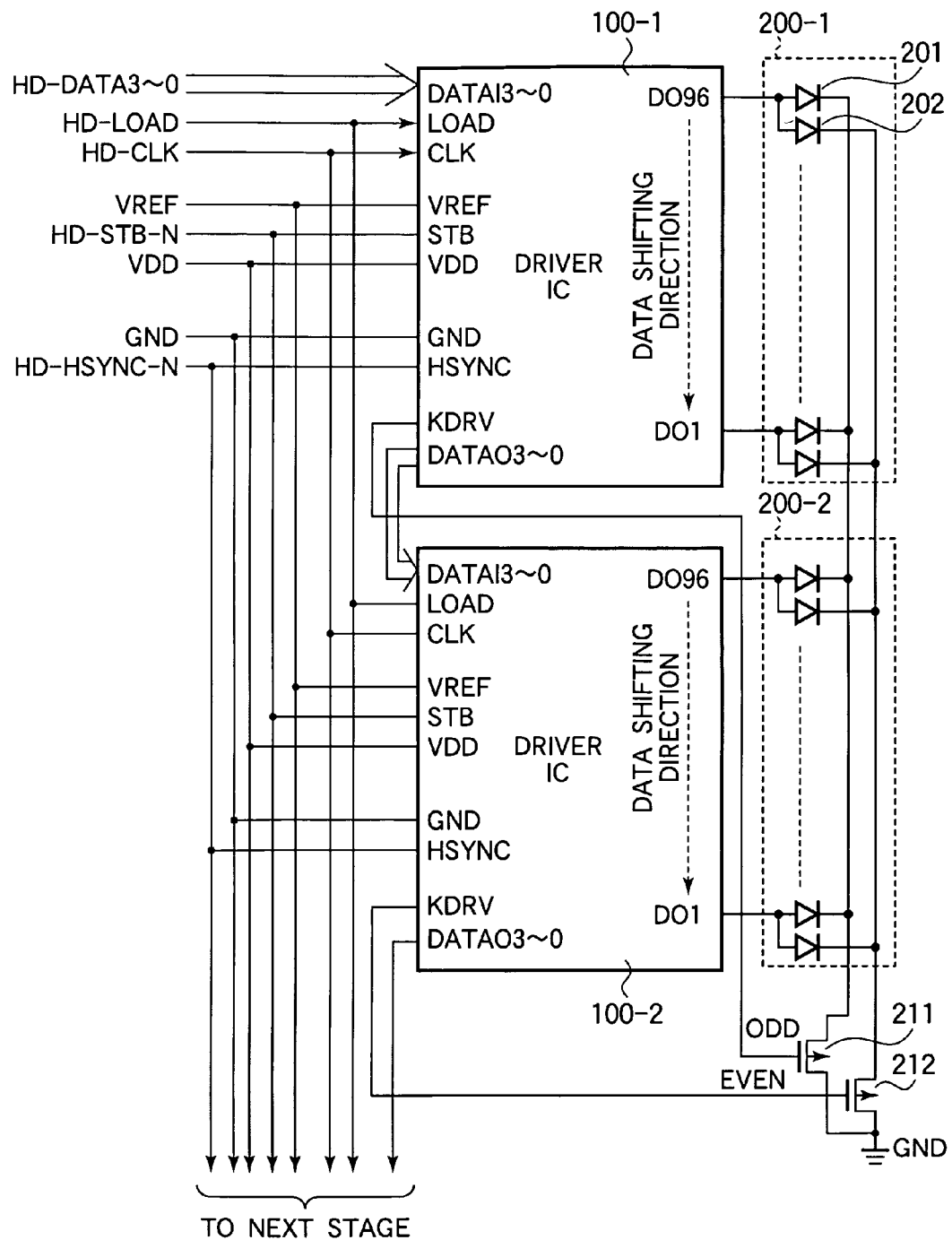
FIG. 4 illustrates the configuration of the LED head shown in FIG. 3.

FIG. 4 illustrates the configuration of the LED head 13 shown in FIG. 3.

The LED head 13 is configured to print on A4 size paper with a resolution of 600 dots per inch (dpi). The LED head 13 includes a total of 26 LED arrays 200-1, 200-2, . . . 200-26, each including 192 LEDs, and hence a total of 4992 LEDs (i.e., LED 201, LED 202, . . . LED 4992). The cathodes of odd-numbered LEDs in each LED array are connected together. The cathodes of even-numbered LEDs in each LED array are connected together. The anodes of all the LEDs in each LED array are also connected together. The group of odd-numbered LEDs and the group even-numbered LEDs in the LED head 13 are driven alternately at different timings.

The LED head 13 includes 26 driver ICs 100 (i.e., 100-1, 100-2, . . . 100-26) that drive the 26 LED arrays 200-1, 200-2, . . . , 200-26. The driver ICs 100 are of a common circuit configuration and are connected in cascade.

Each respective driver IC communicates signals as follows: Data receiving terminals DATAI3 to DATAI0 receive the print data signals HD-DATA3 to HD-DATA0, respectively. A latch terminal LOAD receives the latch signal HD-LOAD. A clock terminal CLK receives the clock signal HD-CLK. A VREF terminal receives a reference voltage VREF that specifies the values of drive currents for driving the LEDs. A drive terminal STB receives a print drive signal HS-STB-N ("N" indicating a negative logic). A VDD terminal receives a supply voltage VDD, and a GND terminal is grounded. A sync signal terminal HSYNC receives a main scanning sync signal HD-HSYNC-N indicative of the top of the odd-numbered LEDs or the top of the top the even-numbered LEDs. The respective driver IC also includes a control terminal KDRV, data output terminals DATAO3 to DATAO0 and drive current output terminals DO96 to DO1. The reference voltage VREF is generated by a reference voltage generator (not shown) in the LED head 13. Either a control signal ODD or a control signal EVEN, which will be described later, is outputted from the control terminal KDRV.

Two power MOS transistors (e.g., N channel MOS transistors or NMOS transistors) 211 and 212 are located in the vicinity of the LED arrays 200-1, 200-2, . . . , 200-26. The anode of the NMOS transistor 211 is connected to the cathodes of the odd-numbered LEDs 201, 203, 205 . . . 4991 and the anode of the NMOS transistor 212 is connected to the cathodes of the even-numbered LEDs 202, 204, 206 . . . , 4992. The cathodes of the NMOS transistors 211 and 212 are connected to the ground GND. The gate of the NMOS transistor 211 is connected to the control terminal KDRV of the driver IC 100-1 and the gate of the NMOS transistor 212 is connected to the control terminal KDRV of the driver IC 100-2.

{Operation of the LED Head}

The operation of the LED head 13 shown in FIG. 4 will be described.

The LED head 13 has four lines for the print data signals HD-DATA3 to HD-DATA0. Data for 4 odd-numbered LEDs of 8 consecutive LEDs is received on a preceding clock signal of two consecutive clock signals HD-CLK, and data for 4 even-numbered LEDs of the 8 consecutive LEDs is received on a following clock of the two consecutive clock signals HD-CLK. The print data signals HD-DATA3 to HD-DATA0 are inputted to the data receiving terminals DATAI3 to DATAI0 on the clock signals CLK at the clock terminal CLK, and are shifted through a shift register formed of flip-flops in the driver ICs 100-1, 100-2, . . . 100-26 on the clock signals CLK.

The latch signal HD-LOAD is then inputted to the latch terminal LOAD of all the driver ICs 100-1, 100-2, . . . 100-26, so that the print data signals HD-DATA0 to HD-DATA3 for a total of 4992 dots are latched into latch circuits 131A1, 131B1, 131C1, and 131D1 to 131A24, 131B24, 131C24, and 131D24 corresponding to the respective flip flops (FFs) in the respective driver ICs so that either a high logic level or a low logic level appears on the output of the latch circuits. Subsequently, LEDs are energized in accordance with the high logic level of the print data signals HD-DATA3 to HD-DATA0 on the print drive signal HD-STB-N, so that the LEDs corresponding to the high logic levels emit light.

{Overall Configuration of Driver ICs}

Figure 5:
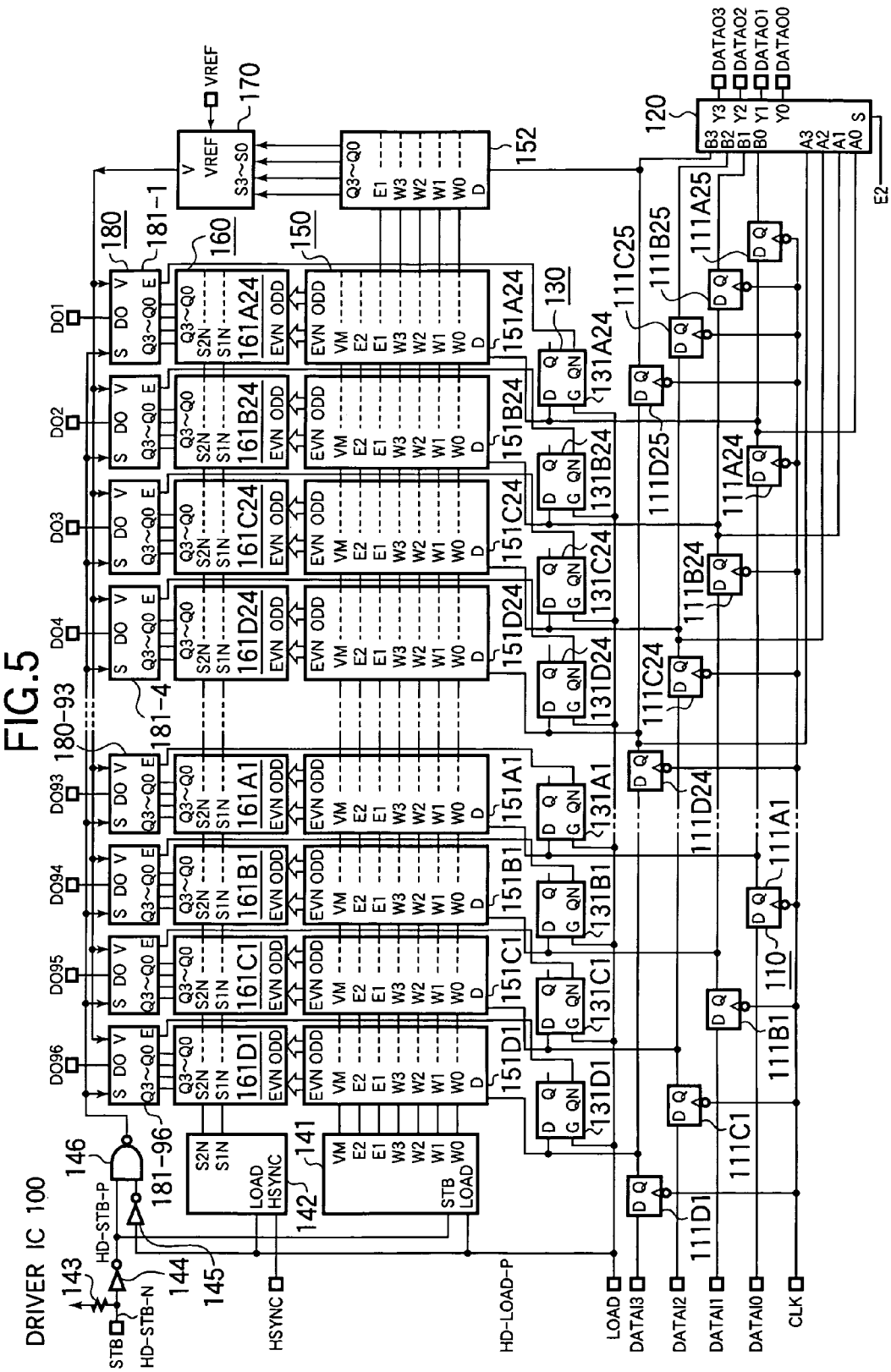
FIG. 5 is a block diagram illustrating the details of one of the driver ICs shown in FIG. 4.

FIG. 5 is a block diagram illustrating the details of one of the driver ICs 100-1, 100-2, . . . 100-26 shown in FIG. 4.

Each driver IC 100 includes a shift register 110 constituted of a plurality of cascaded flip flops FFs 111A1-111A25, FFs 111B1-111B25, FFs 111C1-111C25, and FFs 111D1-111D25. The shift register 110 receives the print data signals HD-DATA3 to HD-DATA0 at the data receiving terminals DATAI3 to DATAI0 on the clock signals HD-CLK received at the clock terminal CLK, while also shifting the print data on the clock CLK.

The flip flops FFs 111A1-111A25 are cascaded to the data input terminal DATAI0. The data output terminal Q of the flip flops FFs 111A24 and 111A25 are connected to the data input terminals A0 and B0, respectively. The output terminal Y0 of a shift-stage selector 120 is connected to a data output terminal DATAO0 of the driver IC 100. Likewise, the flip flops FFs 111B1-11B25, FFs 111C1-111C25, and FFs 111D1-111D25 are also cascaded. Data input terminals DATAI1, DAAI2, and DATAI3 are connected to the data input terminals D of the flip flops FFs 111B1, 111C1, and 111D1. The output terminals Q of the FF111B24 and FF111B25, the FF111C24 and FF111C25, and the flip flops FFs 111D24 and 111D25 are connected to input terminals A1, A2, A3, B1, B2, and B3, respectively. The output terminals Y1, Y2, and Y3 of the shift-stage selector 120 are connected to data output terminals DATAO1, DATAO2, and DATAO3 of the driver IC 100, respectively.

Thus, the flip flops FFs 111A-111A25, FFs 111B1-111B25, FFs 111C1-111C25, and FFs 111D1-111D25 constitute the 25 stage shift register 110. The shift-stage selector 120 enables switching of the shift register 110 between a 24 stage shift register and a 25 stage shift register. The data output terminals DATAO0 to DATAO3 of each driver IC 100 are connected to the data input terminals DATAI0 to DATAIO3 of the next driver IC 100. As described above, the shift register 110 is constituted of a total 26 driver ICs. Thus, for example, the print data signal HD-DATA3 is shifted in the 24×26 stage shift register or the 25×26 stage shift register and is finally loaded to a driver 181-1.

The outputs of the shift register 110 are connected to the inputs of a latch circuit 130 and a memory circuit 150. The outputs of the latch circuit 130 are connected to a driver section 180. A memory controller 141 is connected to the input of the memory circuit 150 whose output is connected to a multiplexer 160. A signal selector 142 is connected to the inputs of the multiplexer 160. The drive terminal STB of the driver IC 100 is connected to a pull-up resistor 143 and an inverter 144. An inverter 145 is connected to the latch terminal LOAD of the driver IC. The output terminals 144 and 145 are connected to the input terminals of a two-input NAND gate 146 whose output terminal is connected to an input of the driver section 180. The input of the driver section 180 is also connected to a control voltage generator 170.

The latch circuit 130 latches the output signals of the shift register 110 on the latch signal HD-LOAD received at the latch terminal LOAD. The latch circuit 130 includes a plurality of sub latching elements 131A1, 131B1, 131C1, 131D1 to 131A24, 131B24, 131C24, and 131D24 whose outputs are connected to the driver section 180.

The memory circuit 150 is controlled by the memory controller 141, and stores dot compensation data for correcting the variations of the LEDs and chip compensation data for compensating for the variations of the light output of each of the respective LED arrays 200). The chip compensation data is used for a coarse compensation of the light output for each chip. The dot compensation data is used for a fine compensation of the light output for each dot. The memory circuit 150 includes a plurality of sub memory circuits 151A1, 151B1, 151C1, and 151D1 to 151A24, 151B24, 151C24, and 151D24 and a sub memory circuit 152. The outputs of the sub memory circuits 151A1, 151B1, 151C1, and 151D1 to 151A24, 151B24, 151C24, and 151D24 and 152 are connected to the multiplexer 160 and the control voltage generator 170, respectively. The memory controller 141, which controls the memory circuit 150, generates a write signal, i.e., W3-W0, E1, and E2 to the plurality of sub memory circuits 151A1, 151B1, 151C1, 151D1 to 151A24, 151B24, 151C24, and 151D24 and the memory 152.

The multiplexer 160 is controlled by the signal selector 142 to select either the dot compensation data for the odd-numbered dots or the dot compensation data for the even-numbered dots, the dot compensation data being outputted from the plurality of sub memory circuits 151A, 151B1, 151C1, 151D1 to 151A24, 151B24, 151C24, and 151D24. The multiplexer 160 includes a plurality of sub multiplexers 161A1, 161B1, 161C1, 161D1 to 161A24, 161B24, 161C24, and 161F24 which are connected to the driver section 180. The signal selector 142, which controls the multiplexer 160, generates a selector signal for selecting either the dot compensation data for the odd-numbered dots or the dot compensation data for the even-numbered dots.

The control voltage generator 170 connected to the input of the driver section 180 receives the reference voltage VREF generated by, for example, a regulator circuit (not shown), and generates a control voltage for driving LEDs. The control voltage is supplied to the driver section 180. Since the reference voltage VREF remains unchanged even if the supply voltage VDD momentarily drops such as when all of the LEDs are turned on, so that the control voltage generator 170 maintains the LED drive current unchanged.

The driver section 180 outputs drive currents through drive current output terminals DO01-DO96 for driving the LED array 200-1, 200-2, . . . , 200-26, the drive currents being generated in accordance with the outputs of the latch circuit 130, NAND gate 146, multiplexer 160, and control voltage generator 170.

The inverter 144 outputs the print drive signal HD-STB-N to the drive terminal STB of the driver IC 100. The inverter 145 outputs the latch signal HD-LOAD-P (P denotes positive logic) to the latch terminal LOAD of the driver IC 100. The NAND gate 146 also receives the print drive signal HD- STB-N and the latch signal HD-LOAD-P, and outputs a control signal that makes the driver section 180 on or off.

{Sub Memory Circuits}

Figure 6:
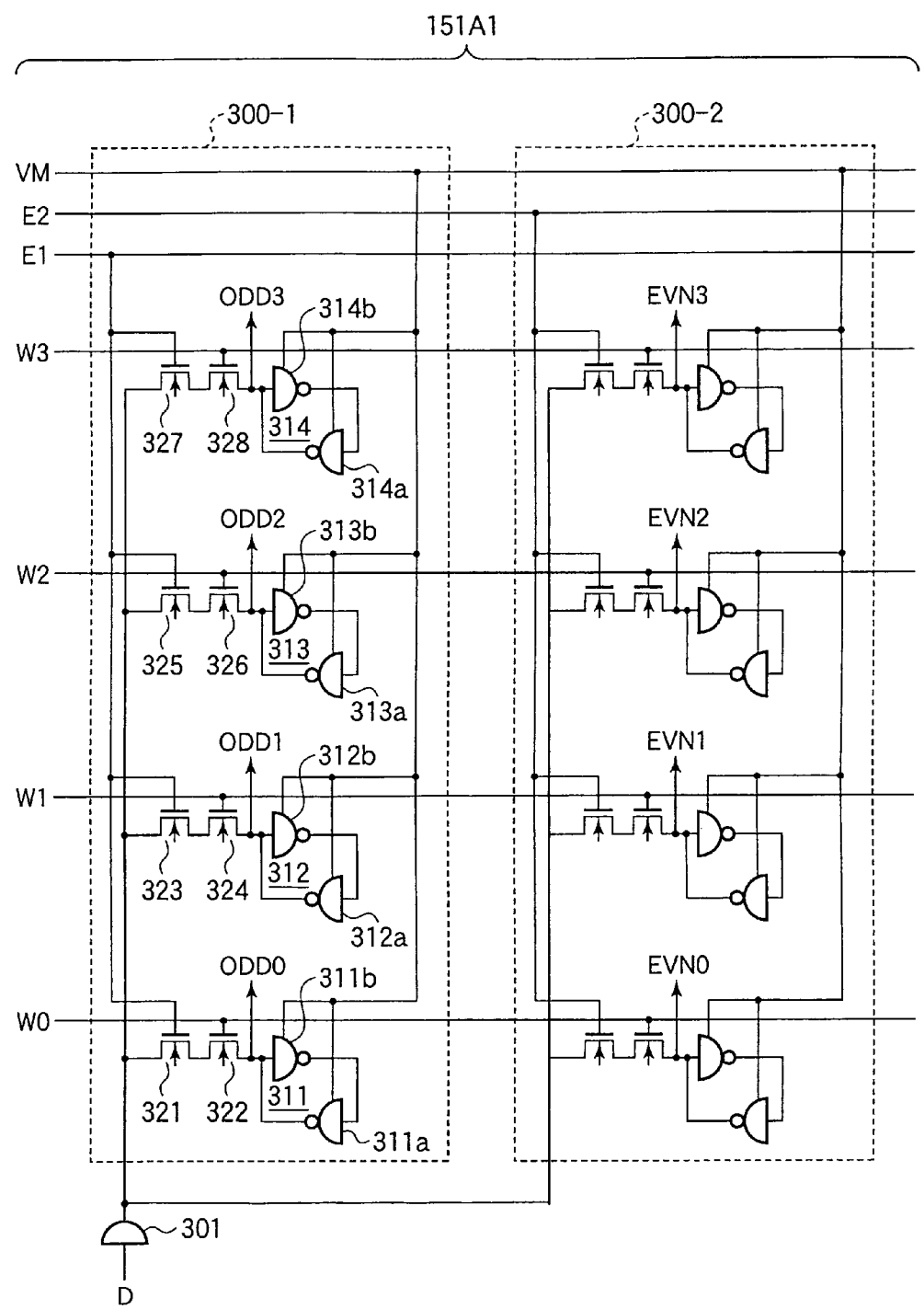
FIG. 6 is a schematic diagram illustrating, by way of example, the configuration of the sub memory.

Each of the sub memory circuits 151A1, 151B1, 151C1, and 151D1 to 151A24, 151B24, 151C24, and 151D24 in the driver IC 100 shown in FIG. 5 may be substantially identical. FIG. 6 is a schematic diagram illustrating, by way of example, the configuration of the sub memory 151A1.

The sub memory circuit 151A1 includes two adjacent, identical memory cell groups 300-1 and 300-2. The memory cell group 300-1 (e.g., dot #1) holds dot compensation data for an odd-numbered dot and the memory cell 300-2 (e.g., dot #2) holds dot compensation data for an even-numbered dot. Each of the memory cell groups 300-1 and 300-2 may be substantially identical; for simplicity only the memory cell group 300-1 will be described, it being understood that the memory cell group 300-2 may work in a similar fashion.

Each memory cell group includes 4 memory cells, e.g., 311-314, that hold the 4-bit dot compensation data for correcting the light output of the LED. The 4-bit dot compensation data is capable of setting the LED drive current in 16 increments for each dot.

The dot compensation data is input from the output terminal Q of the flip flop FF 111A1 of the shift register 110 into the dot compensation data terminal D. An enable signal terminal E1 receives a write-enable signal that is outputted from the enable signal terminal E1 of the memory controller 141 and enables writing of the data for odd-numbered dots. Another enable signal terminal E2 receives a write-enable signal that is outputted from the enable signal terminal E2 of the memory controller 141 and enables writing of the data for even-numbered dots. Memory cell selecting terminals W0-W3 receive write control signals from the memory cell selecting terminals W0-W3 of the memory controller 141. The supply terminal VM supplies a different voltage from the supply voltage VDD.

The compensation data terminal D is connected to the memory cell group 300-1 via data feeding circuits (e.g., buffers) 301. The memory cell group 300-1 includes memory means (e.g., cells) 311 to 314 and data switching means (NMOS transistor switches 321 to 328). The memory cell 311 includes first and second inverters 311a and 311b cascaded to form a ring circuit. In other words, the first inverter has a first output terminal and a first input terminal and the second inverter having a second output terminal and a second input terminal. The first output terminal is connected to the second input and the second output is connected to the first input terminal. Likewise, the memory cell 312 includes inverters 312a and 312b cascaded to form a ring. The memory cell 313 includes inverters 313a and 313b to form a ring. The memory cell 314 includes inverters 314a and 314b to form a ring. The supply terminals of the inverters 311a, 311b, 312a, 312b, 313a, 313b, 314a, and 314b are connected to the supply terminal VM.

The gates of NMOS transistors 321, 323, 325, and 327 are connected to the enable signal terminal E1 while the gates of NMOS transistors 322, 324, 326, and 328 are connected to the memory cell selecting terminals W0, W1, W2, and W3, respectively. The output terminal of the buffer 301 is connected to a series circuit of the NMOS transistors 321 and 322, compensation data terminal ODD0, and the memory cell 311; a series circuit of NMOS transistors 323 and 324, compensation data terminal ODD1, and the memory cell 312; a series circuit of NMOS transistors 325 and 326, compensation data terminal ODD2, and the memory cell 313; and a series circuit of NMOS transistors 327 and 328, compensation data terminal ODD3, and the memory cell 314.

The memory cell group 300-2 is of the same configuration as the memory cell group 300-1 except that the memory cell group 300-2 is connected to the enable signal terminal E2 and compensation data terminals EVN0-EVN3.

{Multiplexer}

Figure 7:
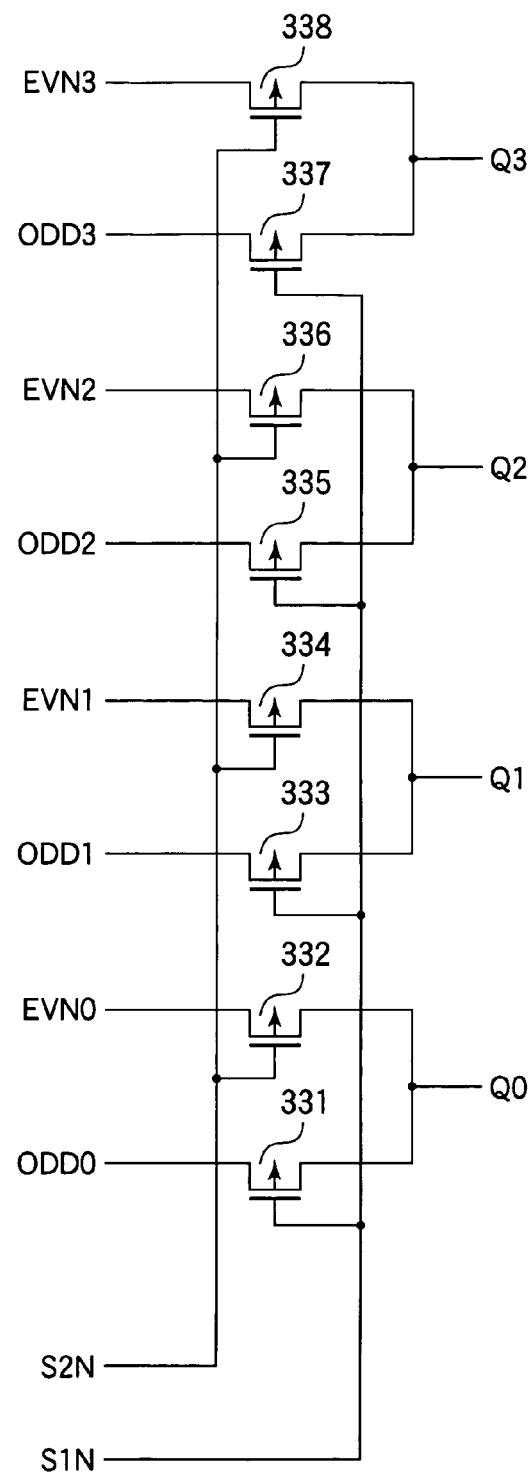
FIG. 7 illustrates the configuration of the multiplexer 161 shown in FIG. 6.

FIG. 7 illustrates the configuration of the multiplexer 161 shown in FIG. 6.

Referring to FIG. 7, the compensation data terminals ODD0-ODD3 of the multiplexer 161 receive the dot compensation data from the compensation data terminals ODD0-ODD3 of the sub memory circuit 151A1. The compensation data terminals EVN0-EVN3 of the multiplexer 161 receive the dot compensation data from the compensation data terminals EVN0-EVN3 of the sub memory circuit 151A1. Selection signal terminals S1N and S2N of the multiplexer 161 receive selection signals from selection signal terminals S1N and S2N of the signal selector 142. Compensation data terminals Q0-Q3 output dot compensation data. P channel MOS transistors (referred to as PMOS transistor hereinafter) 331-338 select input data.

PMOS transistors 331, 333, 335, and 337 are controlled to turn on or off by the selection signal S1N, thereby connecting the compensation data terminals ODD0-ODD3 to the compensation data terminals Q0-Q3 or disconnecting the compensation data terminals ODD0-ODD3 from the compensation data terminals Q0-Q3. PMOS transistors 332, 334, 336, and 338 are controlled to turn on or off by the selection signal S2N applied to their gate, thereby connecting the compensation data terminals EVN0-EVN3 to the compensation data terminals Q0-Q3 or disconnecting the compensation data terminals EVN0-EVN3 from the compensation data terminals Q0-Q3.

{Driver}

Figure 8:
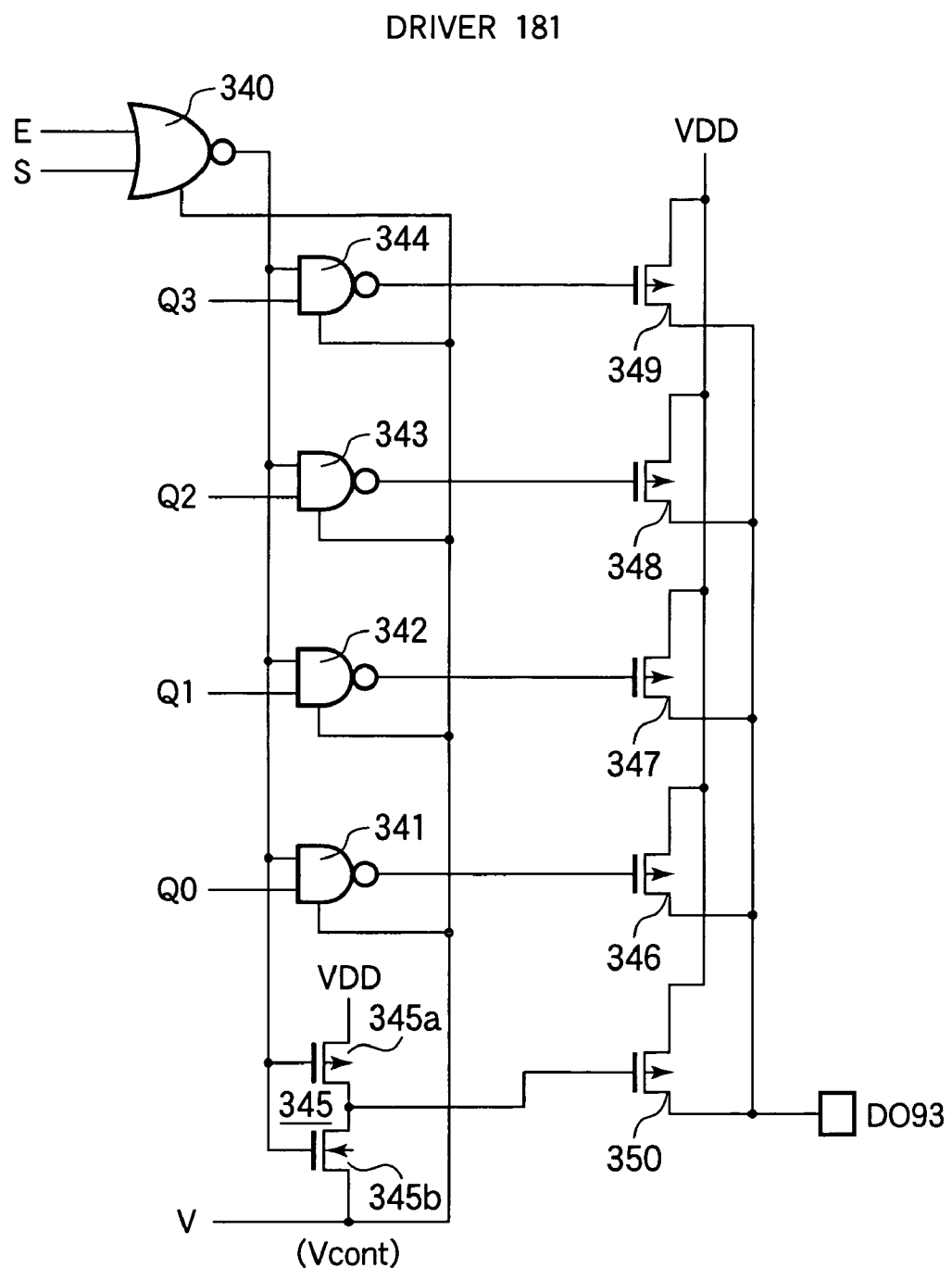
FIG. 8 is a schematic diagram of the driver shown in FIG. 6.

FIG. 8 is a schematic diagram of the driver 181 shown in FIG. 6.

Referring to FIG. 8, a print data terminal E receives a print signal (negative logic) from an inverted output terminal QN of the latch 131A1. A control terminal S receives a negative logic LED drive signal for driving an LED from the NAND gate 146. The compensation data terminals Q0-Q3 receive the dot compensation data from the compensation data terminals Q0-Q3 of the multiplexer 161A1. A supply terminal V receives a control voltage Vcont from the supply terminal V of the control voltage generator 170. The VDD terminal receives the supply voltage VDD. A drive current outputting terminal DO (i.e., DO93) outputs the drive current to the anode of a corresponding LED via a bonding wire (not shown).

The print data terminal E and control terminal S are supplied to the input terminals of a two-input NOR gate 340. The NOR gate 340 has a supply terminal connected to the supply terminal V to which the control voltage Vcont is applied. The output terminal of the NOR gate 340 and the compensation data terminals Q0-Q3 are connected to the input terminals of two-input NAND gates 341-344, respectively. The two-input NAND gates 341-344 have their supply terminals connected to the VDD terminal and ground terminals connected to the supply terminal V to which the control voltage Vcont is applied. The output terminals of the NOR gate 340 is connected to the gates of PMOS transistors 345a and NMOS 345b that constitute a complementary symmetry MOS inverter (CMOS inverter). The PMOS transistor 345a and NMOS transistor 345b are connected in series between the VDD terminal and the supply terminal V.

The output terminals of the NAND gates 341-344 are connected to the gates of the PMOS transistors 346-349. The gate of the PMOS transistor 350 is connected to the output terminal of the CMOS inverter 345. The sources and drains of the PMOS transistors 346-350 are connected in parallel between the VDD terminal and drive current outputting terminal DO. The PMOS transistor 350 is a main drive transistor that supplies a large portion of the LED drive current and the PMOS transistors 346-349 are auxiliary transistors that adjust a small portion of the LED drive current for each dot, thereby correcting the light output of the LED.

The difference between the voltage (potential) at the VDD terminal and the control voltage Vcont at the supply terminal V is substantially equal to the gate-source voltage when the PMOS transistors 346-350 are turned on. Varying the gate-to-source voltage or control voltage Vcont allows adjustment of the drain current of the PMOS transistors 346-350. The control voltage generator 170 shown in FIG. 6, which supplies the control voltage Vcont, controls the control voltage Vcont based on the reference voltage VREF so that the drain currents through the PMOS transistors 346-350 have their corrected values.

The driver 181-93 of the aforementioned configuration operates as follows.

When the print data received at the print data terminal E is ON (logic low or "L") and the control signal received at the control terminal S is ON (logic low or "L"), the output of the NOR gate 340 is off (logic high or "H"). At this moment, the outputs of the NAND gates 341-344 and the output of the CMOS inverter 345 become equal to the supply voltage VDD or Vcont in accordance with the data at the compensation data terminals Q3-Q0.

The PMOS transistor 350 is controlled by the print data signal input to the print data terminal E. The dot compensation data is outputted from the sub memory circuit 151A1 (FIG. 1) to the compensation data terminals Q0-Q3 of the multiplexer 161A1. When the output of the NOR gate 340 goes high, the PMOS transistors 346-349 are selectively driven in accordance with the dot compensation data that appears at the compensation data terminals Q0-Q3.

In other words, when the PMOS transistor 350 is driven, the PMOS transistors 346-349 are also selectively driven, so that the LED drive current is the sum of the drain current flowing through the PMOS transistor 350 and the drain currents flowing through the PMOS transistors 346-349 and is supplied to the corresponding LED from the drive current output terminal DO93.

When the PMOS transistors 346-349 are driven, the outputs of the NAND gates 341-344 are low ("L") (=approximately Vcont), so that the gate voltage of the PMOS transistors 346-349 are nearly equal to the control voltage Vcont. At this moment, the PMOS transistor 345a is OFF and the NMOS 345b is ON so that the gate voltage of the PMOS transistor 350 is also nearly equal to the control voltage Vcont. This implies that the drain currents flowing through the PMOS transistors 346-350 can be driven by the single control voltage Vcont. At this moment, the NAND gates 341-344 receive the supply voltage VDD at its supply terminal and the control voltage Vcont at its ground terminal. The input signal can have a voltage between the supply voltage VDD and the control voltage Vcont, and the LOW level need not be 0 volts.

Figure 9:
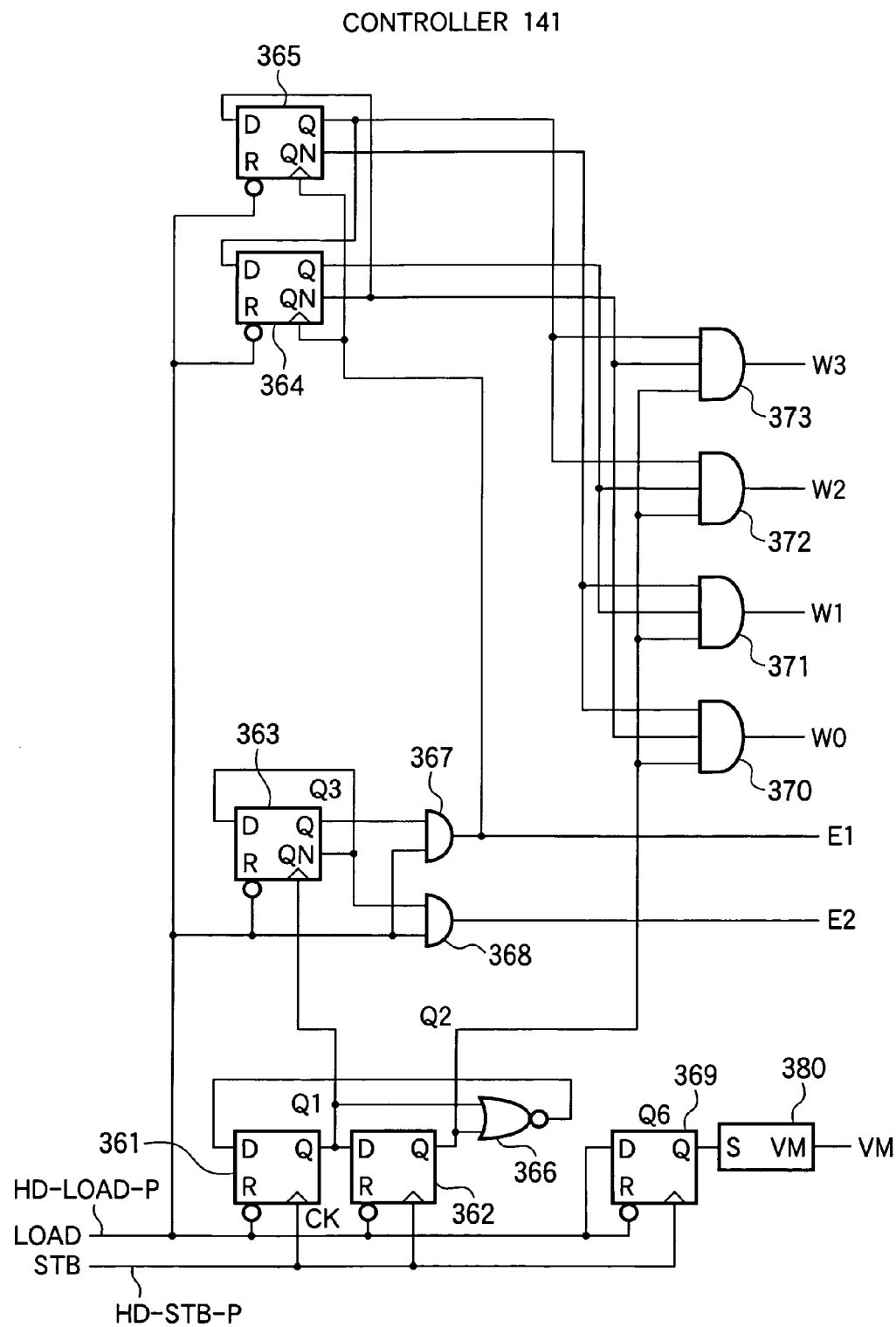
FIG. 9 is a schematic diagram illustrating the configuration of the control circuit shown in FIG. 6.

FIG. 9 is a schematic diagram illustrating the configuration of the memory controller 141 shown in FIG. 6.

The latch terminal LOAD receives the positive logic latch signal HD-LOAD-P. The drive terminal STB receives a positive logic print drive signal HD-STB-P outputted from the inverter 144 shown in FIG. 6. The memory cell selecting terminals W0-W3 output the write signal to the memory circuit 150 shown in FIG. 6. The enable signal terminals E1 and E2 output the write enable signals to the memory circuit 150. The supply terminal VM outputs the supply voltage to the memory circuit 150. The memory controller 141 also includes the flip flops FFs 361-365 and 369, two-input NOR gate 366, two-input AND gates 367 and 368, 3-input AND gates 370-373, and a voltage level shifter 380.

The flip-flops FFs 361, 362, and 369 include a negative logic reset terminal R, a clock signal terminal CK, and a non-inverted output terminal Q. The reset terminal R receives the latch signal HD-LOAD-P from the latch terminal LOAD. The CLK terminal receives the positive logic print drive signal HD-STB-P from the drive terminal STB. The output terminal Q outputs the data. Each of the flip-flops FFs 363-365 has a negative logic reset terminal R for receiving the latch signal HD-LOAD-P from the latch terminal LOAD. Each of the flip-flops FFs 363-365 also has a clock terminal CK, a data input terminal D, a non-inverted output terminal Q, and an inverted output terminal QN.

The outputs Q of the flip flops FFs 361 and 362 are connected to the inputs of the NOR gate 366. The output of the NOR gate 366 is connected to the input terminal D of the flip flop FF 361. The output Q of the flip flop FF 361 is fed to the clock terminal CK of the flip flop FF 363 whose output QN is connected to the input terminal D of the flip flop FF 363. The output terminal Q of the flip flop FF 363 and the latch LOAD are input to the inputs of the AND gate 367 whose output is connected to the enable signal terminal E1. The output QN of the flip flop FF 363 and the latch LOAD are connected to the inputs of the AND gate 368 whose output is connected to the enable E2.

The output of the AND gate 367 is connected to the clock terminals CK of the flip flops FFs 364 and 365. The negative logic reset terminals R of the flip flops FFs 364 and 365 are connected to the latch terminal LOAD. The output terminal QN of the flip flop FF 364 is connected to the input terminal D of the flip flop FF 365. The output terminals Q and QN of the flip flops FFs 364 and 365 and the output terminal Q of the flip flop FF 362 are connected to the input terminals of the AND gates 370-373. The outputs of the AND gates 370-373 are connected to the memory cell selecting terminals W0-W3, respectively.

The first input terminal and the second input terminal of the AND gate 373 are connected to the output terminals Q of the flip flop FF 365 and the output terminals QN of the flip flop FF 364, respectively. The first input terminal and second input terminal of the AND 372 are connected to the output terminal Q of the flip flop FF 365 and the output terminal Q of the flip flop FF 364, respectively. The first input terminal and the second input terminal of the AND gate 370 are connected to the output terminal QN of the flip flop FF 365 and the output terminal QN of the flip flop FF 364, respectively.

The input terminal D of the flip flop FF 369 is connected to the latch terminal LOAD. The output terminal Q of the flip flop FF 369 is connected to the input terminal S of the voltage level shifter 380. The supply terminal VM of the voltage level shifter 380 is connected to the supply terminal VM of the memory circuit 150 shown in FIG. 6. The voltage level shifter 380 outputs a voltage obtained by decreasing the supply voltage VDD by a predetermined value according to the output level "H" or "L" of the flip flop FF 369 inputted to the input terminal S.

Figure 10:
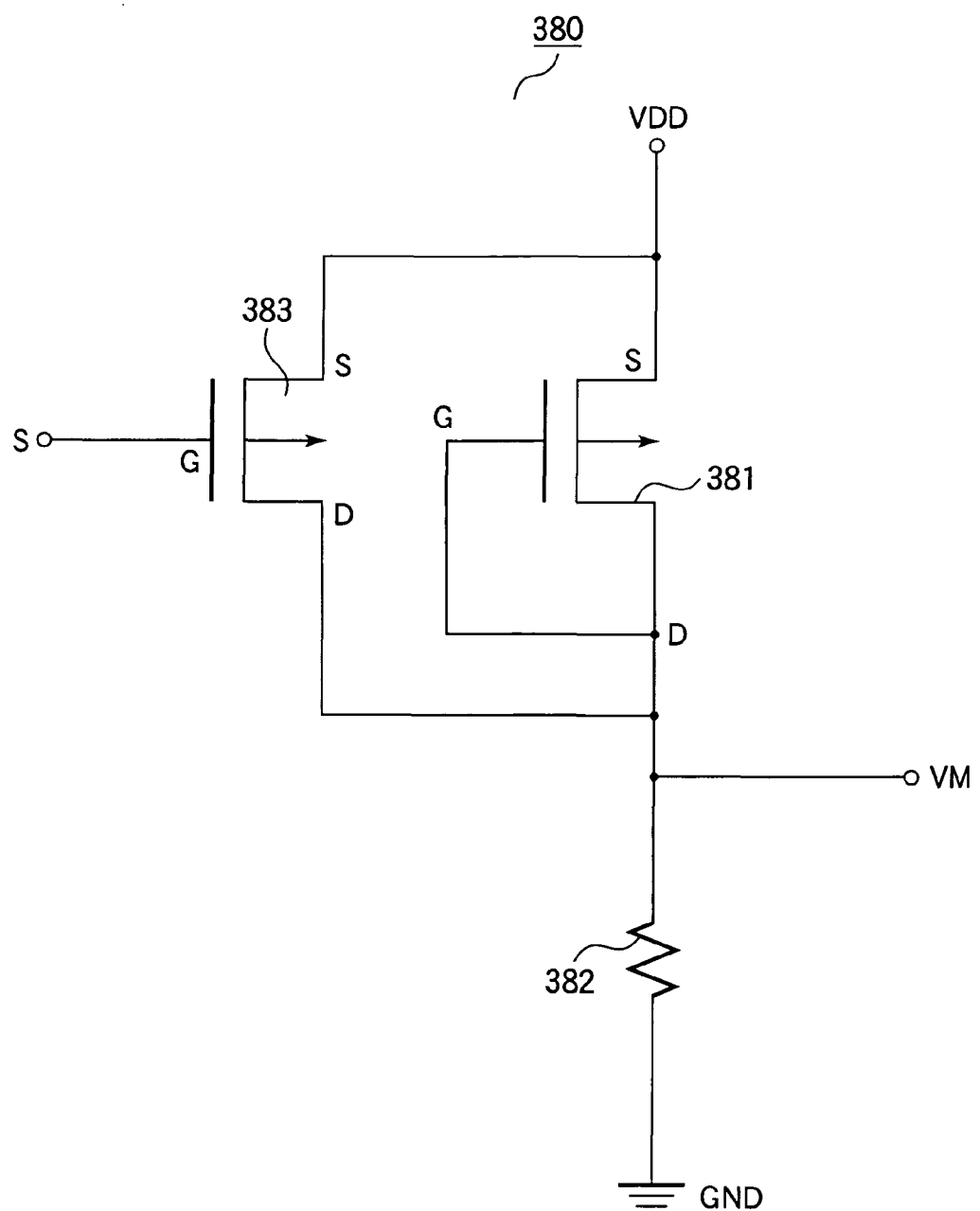
FIG. 10 is a schematic diagram illustrating the configuration of the voltage level shifter shown in FIG. 9.

FIG. 10 is a schematic diagram illustrating the configuration of the voltage level shifter 380 shown in FIG. 9. The voltage level shifter 380 includes PMOS transistors 381 and 383 and a resistor 382. The PMOS 381 and the resistor 382 are connected in series between the VDD terminal and the ground terminal GND, the drain and gate of the PMOS transistor 381 being diode-connected. The PMOS transistor 383 is in parallel with the PMOS transistor 381. The supply terminal VM is connected to the junction of the PMOS transistor 381 and the resistor 382.

When the signal at the input terminal S goes high, the PMOS transistor 383 goes OFF. Since the gate of the PMOS transistor 381 is connected to the drain of the PMOS transistor 381, the PMOS transistor 381 continues to operate in its saturation region even though the PMOS transistor 383 is off, so the current flows through the resistor 382. The voltage across the resistor 382 (i.e., voltage at the VM) is given by $$\text{Voltage at } VM = VDD - (Vtp + \Delta V)$$

where Vtp is the threshold voltage of the PMOS transistor 381, $\Delta V$ is the gate-to-drain overdrive voltage when the PMOS transistor 381 operates in its saturation region.

The supply voltage VDD is typically 5 V. The resistance value of the resistor 382 is selected such that $Vtp + \Delta V$ is approximately 2 V. As a result, the voltage at the supply terminal VM changes from 5 V to 3 V, which is illustrated at portion "N" in FIG. 13.

When the input terminal S is "L," the PMOS transistor 383 becomes ON, short-circuiting the source and the drain so that a voltage substantially equal to the supply voltage VDD is outputted from the supply terminal VM.

{Control Circuit}

Figure 11:
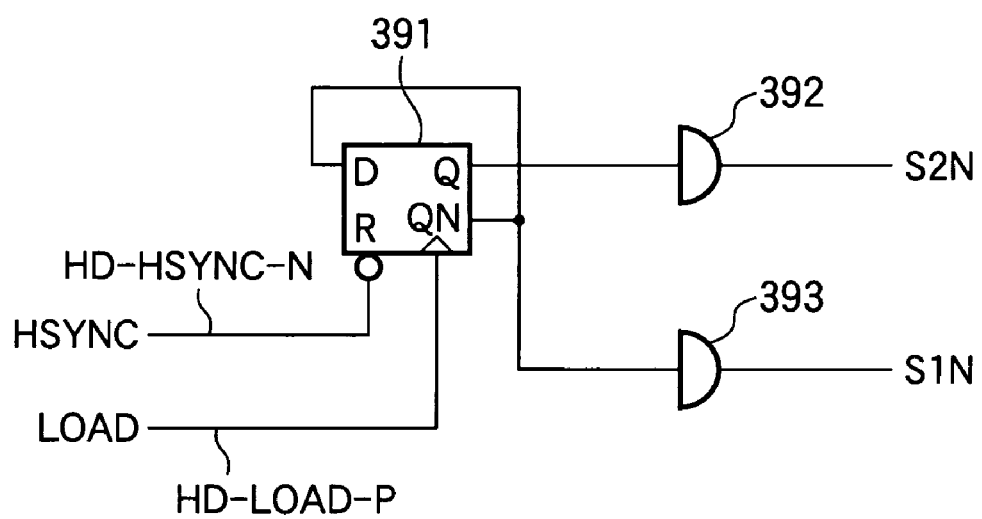
FIG. 11 a schematic diagram illustrating the configuration of the signal selector shown in FIG. 6.

FIG. 11 a schematic diagram illustrating the configuration of the signal selector 142 shown in FIG. 6.

The signal selector 142 has a flip flop FF 391 and buffers 392 and 393. The reset terminal R (negative logic) of the flip flop FF 391 receives the main scanning sync signal HD-HSYNC-N from the sync signal terminal HSYNC of the driver IC 100. A clock terminal CK receives the latch signal HD-LOAD-P (positive logic) from the latch terminal LOAD. An input terminal D is connected to an inverted-output terminal QN. A non-inverted output terminal Q outputs a non-inverted output. The signals appearing on the output terminals Q and QN are fed to the selection signal terminals S2N and S1N through the buffers 392 and 393, respectively.

The signal selector 142 is configured to output the selection signal of either the "H" level or the "L" level to the selection signal terminals S1N and S2N on the rising edge of the latch signals HD-LOAD-P received at the latch terminal LOAD.

{Control Voltage Generator}

Figure 12:
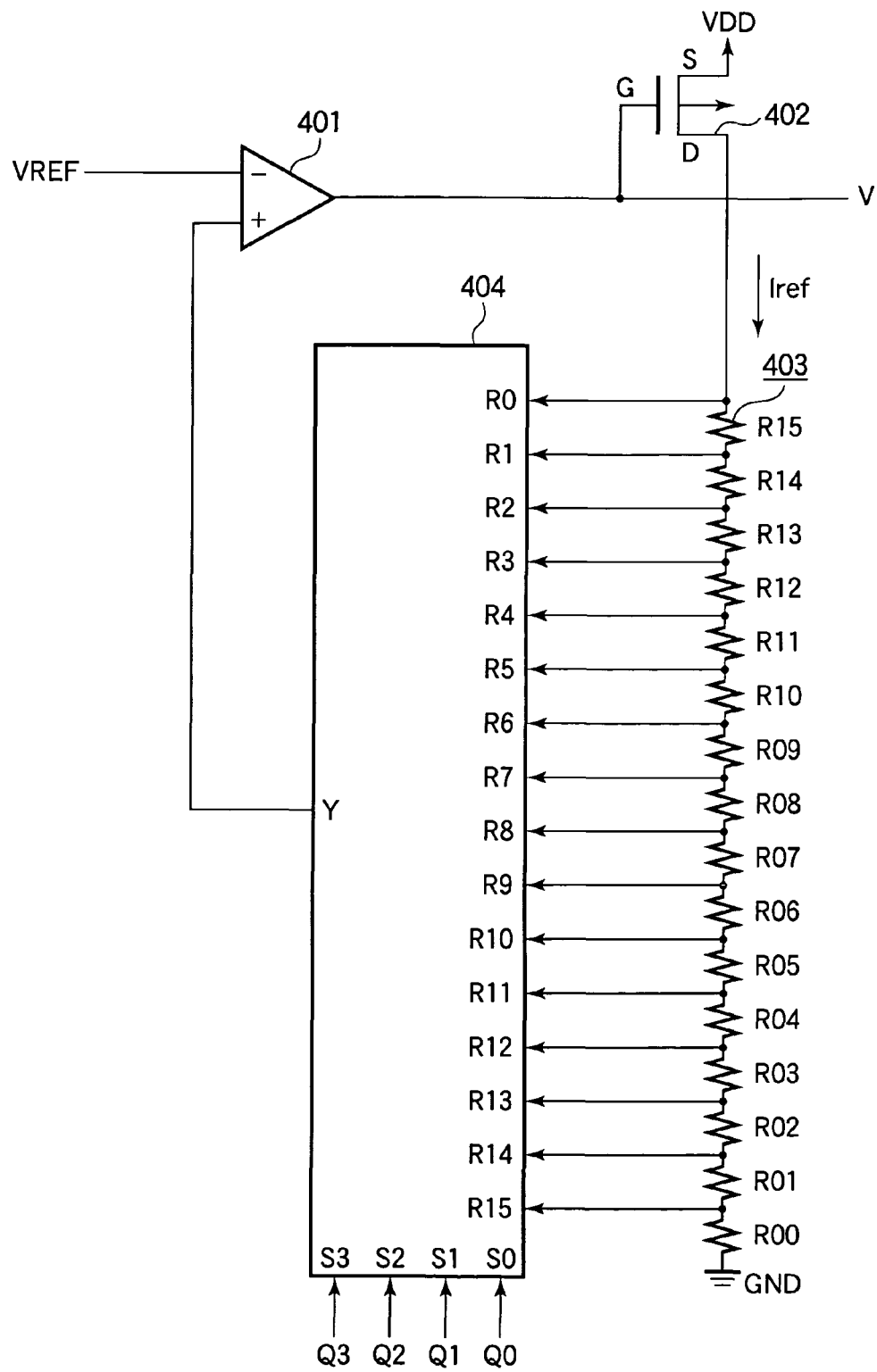
FIG. 12 illustrates the configuration of the control voltage generator shown in FIG. 6.

FIG. 12 illustrates the configuration of the control voltage generator 170 shown in FIG. 6.

Each driver IC 100 includes the corresponding control voltage generator 170. The control voltage generator 170 includes an operational amplifier 401, a PMOS transistor 402, a voltage divider 403 including series-connected resistors R00-R15, and analog multiplexer 404.

The operational amplifier 401 has an inverted input terminal connected to the VREF terminal, a non-inverted input terminal connected to the output terminal Y of the multiplexer 404, and an output terminal connected to a supply terminal V and the gate of the PMOS transistor 402. The PMOS transistor 402 has the same gate length as the PMOS transistors 346-350 shown in FIG. 8. The PMOS transistor 402 has a source connected to the VDD terminal and a drain connected to the ground terminal GND through the voltage divider 403.

The multiplexer 404 includes 16 input terminals P0-P15 that receive analog voltages from junction points of the voltage dividing resistors R15-R00 connected in series, and input terminals S0-S3 that receive logic signals from the output terminals Q0-Q3 of the sub memory circuit 152 shown in FIG. 6. The four logic signals are used to produce 16 different logic combinations for selecting one of the input terminals P0-P15, thereby outputting a corresponding analog voltage from the output terminal Y to the non-inverted input terminal of the operational amplifier 401. In other words, one of the input terminals P0-P15 is selected in accordance with the logic levels at the input terminals S3-S0 of the multiplexer 404, thereby establishing a current path between the output terminal Y and the selected one of the input terminals P0-P15.

The OP amp 401, voltage divider resistors R00-R15, and PMOS transistor 402 constitute a feedback control circuit which maintains the voltage at the non-inverted input terminal of the OP amp 401 substantially equal to the reference voltage VREF. For this reason, the drain current Iref of the PMOS transistor 402 is determined by the resultant resistance of those voltage divider resistors R00-R15 selected by the multiplexer 404 and the reference voltage VREF inputted to the OP amp 401.

For example, when the input terminals S3-S0 of the multiplexer 404 are at logic levels "1," "1," "1," and "1" (i.e., maximum value), respectively, the input terminal P15 is connected to the output terminal Y so that the voltage at the input terminal P15 is substantially the same as the reference VREF. Consequently, the drain current Iref of the PMOS 402 is given as follows:

$$Iref = VREF/R00$$

On the other hand, the logic levels at the terminals S3-S0 are "0," "1," "1," and "1" (i.e., medium value), the input terminal P7 is connected to the output terminal Y so that the voltage at the input terminal P7 is substantially the same as the reference voltage VREF. Consequently, the drain current Iref of the PMOS 402 is given as follows:

$$Iref = VREF/(R00+R01+R02+R03+R04+R05+R06+R07+R08)$$

When the logic levels at the terminals S3-S0 are "0000" (i.e., minimum value), the input terminal P0 is connected to the output terminal Y so that the drain current Iref of the PMOS 402 is given as follows:

$$Iref = VREF/(R00+R01+R02 \ldots +R15)$$

The PMOS transistors 346-350 shown in FIG. 8 and the PMOS transistor 402 shown in FIG. 12 have the same gate length and are driven to operate in their saturation regions, and so the respective PMOS transistors constitute a current mirror of the other. When the PMOS transistors 346-350 become ON, the drain current Iref is proportional to the reference voltage VREF. Therefore, the drain current Iref can be adjusted in 16 increments by selectively setting the logic levels at the input terminals S3-S0 of the multiplexer 404. Thus, the drain currents through the PMOS transistors 346-350 can also be adjusted in 16 increments.

{Overall Operation of LED Head}

Figure 13:
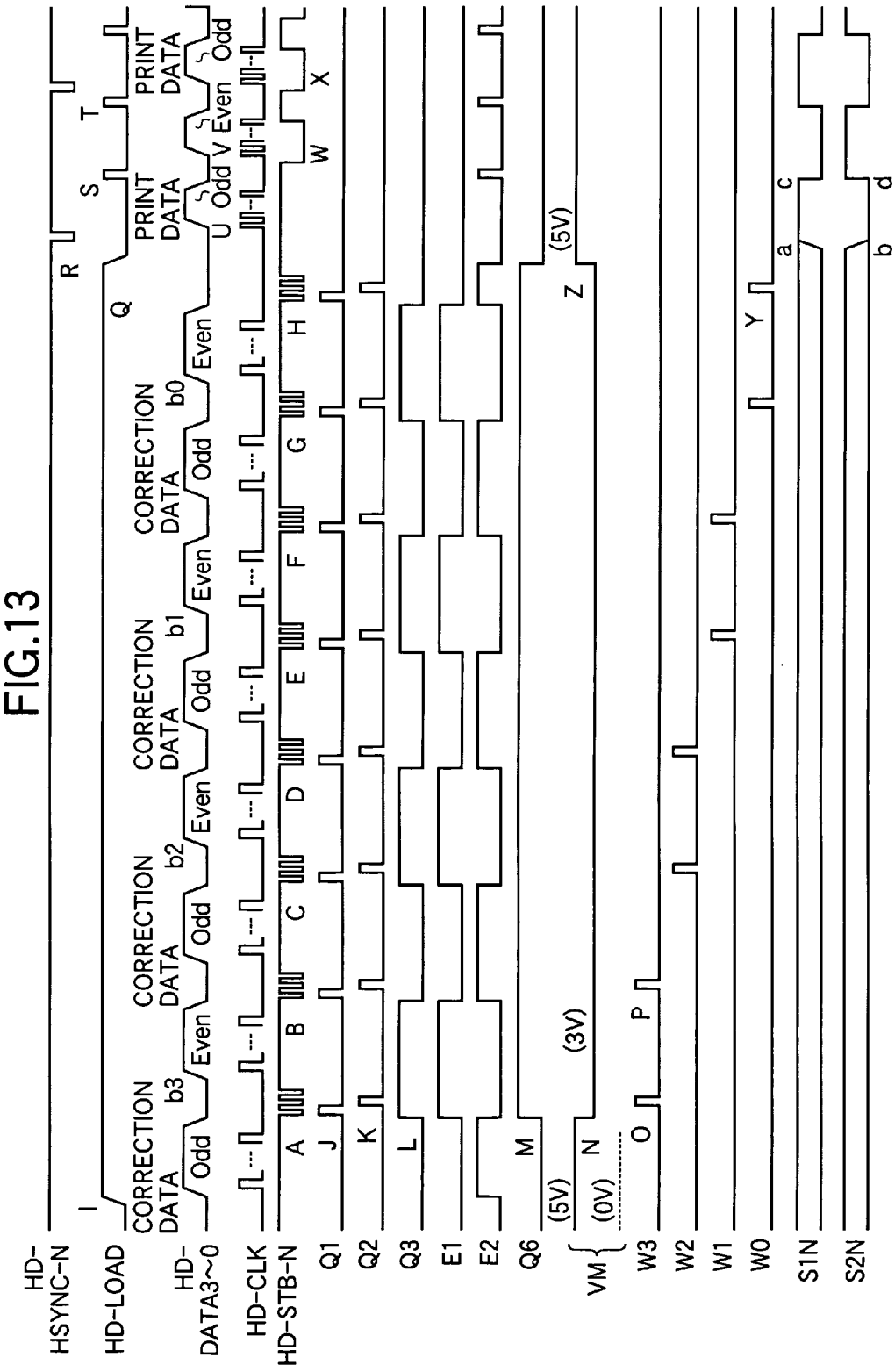
FIG. 13 is a timing chart illustrating the processing of the dot compensation data performed on the LED head after power-up of the image forming apparatus of the first embodiment.

FIG. 13 is a timing chart illustrating the processing of the dot compensation data performed on the LED head 13 after power-up of the image forming apparatus 1 of the first embodiment.

Prior to the transfer of the dot compensation data, the latch signal HD-LOAD is set to the "H" level indicating that the dot compensation data will follow (portion "I").

The dot compensation data for one dot is 4-bit data consisting of bit 3 to bit 0. The data for bit 3 of the print data signals HD-DATA3 to HD-DATA0, by way of example, is inputted in parallel into the shift register 110 constituted of the flip flops FF 111A1 to FF 111D24 (FIG. 6), being shifted by one position upon each clock signal HD-CLK. Likewise, the data for bit 2, bit 1, and bit 0 is inputted following the data for bit 3. Upon completion of shifting, three pulses of the print drive signal HD-STB-N are inputted as depicted at portion "A," enabling the memory controller 141 shown in FIG. 9 to operate.

The signals Q1, Q2, Q3, and Q6 shown in FIG. 13 are signals that appear on the output terminals of the flip flops FFs 361, 362, 363, and 369 shown in FIG. 9. The enable terminals E1 and E2 are connected to the outputs of the AND gates 367 and 368. The memory cell selecting terminals W3-W0 are connected to the outputs of the AND gates 373-370. The selection signal terminals S1N and S2N are connected to the output terminals of the buffers 393 and 392 shown in FIG. 11, respectively.

Referring to FIG. 13, when the first pulse of the print drive signal HD-STB-N is received as depicted at portion "A," the signal Q1 appears (portion "J"). When the second pulse of the printing driving HD-STB-N is received, the signal Q2 appears (portion "K"). The signal Q3 appearing on the output terminal of the flip flop FF 363 turns each time the signal Q1 appears. For example, the signal Q3 goes high ("H") and goes low at the second output signal at the output terminal Q1 as illustrated in FIG. 13. The signals at the output terminals QN and Q3 of the flip flop FF 363 are fed to the AND gates 367 and 368, respectively, the AND gates 367 and 368 outputting the enable signals E1 and E2.

When the latch signal HD-LOAD is at the "L" level, the reset terminal R of the flip flop FF 369 shown in FIG. 9 (portion "I") is active so that a signal of a "L" level appears on the output terminal Q. At this moment, the input terminal S of the voltage level shifter 380 (FIG. 10) receives the "L" level from the output terminal Q of the FF 369 (FIG. 9). Since the gate of the PMOS 383 in the voltage level shifter 380 is at the "L" level, the PMOS 383 is "ON" so that the supply terminal VM is at substantially the same voltage (e.g., 5V) as the supply voltage VDD.

When the first pulse of the print drive signal HD-STB-N is received as shown in FIG. 13, the signal at the output terminal Q6 of the flip flop FF 369 shown in FIG. 9 goes high (portion "M"), which in turn is input to the input terminal S of the voltage level shifter 380. Thus, the signal at the input terminal S goes high ("H" level), turning the PMOS transistor 383 off. Thus, the voltage substantially equal to the supply voltage VDD−(tp+ΔV) appears on the supply terminal VM.

The supply voltage VDD is typically 5 V and therefore the resistance of the resistor 382 is selected such that the tp+ΔV is substantially equal to 2V. Thus, a voltage of about 3 V appears on the supply terminal VM. Portion "N" shown in FIG. 13 illustrates a transition of the voltage at the supply terminal VM from 5 to 3 V. The dotted line in the vicinity of the voltage at the supply terminal VM indicates the ground (i.e., 0 volts).

The signals also appear at the memory cell selecting terminals W3-W0 (FIG. 9) when the output terminal Q2 of the flip flop FF 362 goes high. Two consecutive pulses appear at the memory cell selecting terminal W3 as depicted at "O" and "P". Likewise, two consecutive pulses appear at each of the memory cell selecting terminals W2, W1, and W0. Each time the pulse appears at the memory cell selecting terminals W3 to W0, data is written into the memory circuit 150 shown in FIGS. 1 and 6, i.e., the data for odd-numbered dots being written into the memory cell group 300-1 on the first pulses at the memory cell selecting terminals W3-W0 and the data for even-numbered dots being written into the memory cell group 300-2 on the second pulses at the memory cell selecting terminals W3-W0.

The memory controller 141 outputs first pulses to the memory circuit 150 to control the data write operation in response to the print drive signal HD-STB-N for portions "A," "C," "E," and "G." Likewise, the memory controller 141 outputs the second pulses to the memory circuit 150 to control the data write operation in response to print drive signal HD-STB-N for "B," "D," "F," and "H." In this manner, upon completion of the data write operation of bit 3 to bit 0 of the dot compensation data into the memory circuit 150, the latch signal HD-LOAD is set to the "L" level (portion "Q" in FIG. 13) to enable transfer for the print data signals HD-DATA3 to HD-DATA0.

When the latch signal HD-LOAD goes low ("L"), the flip flop FF 369 shown in FIG. 9 is reset, causing the output terminal Q6 to go low ("L"). As a result, the input terminal S of the voltage level shifter 380 shown in FIG. 10 goes low ("L"), so that the signals at the supply terminal VM returns to about 5 V (at portion "Z" in FIG. 13).

Next, prior to printing one line, the main scanning sync signal HD-SYNC-N is inputted (portion "R"), indicating that the following data is for odd-numbered dots. The print data signals HD-DATA3 to HD-DATA0 at portion "U" are transferred, being shifted through the shift register 110 (FF 111A1 to FF 111D1, . . . , FF 111A24 to FF 111D24). The print data signals HD-DATA0 to HD-DATA0 are latched on the latch signal HD-LOAD as depicted at portion "S" into the latch 130 (sub latching elements 131A1 to 131D1, . . . 131A24 to 131D24).

Then, the print drive signals HD-STB-N goes low ("L" level) as depicted at portion "W," causing the driver section 180 to drive the LED to emit light. If the print data signals HD-DATA3 to HD-DATA0 are at the "H" level, the LEDs are driven to emit light for a time period during which the printing controlling signals HD-STB-N remains at the "L" level as depicted at portions "W" and "X". Likewise, the data for the even-numbered dots is transferred at portion "V" and is latched upon the pulse as depicted at portion "T."

{Details of Transfer of Print Data}

Figure 14:
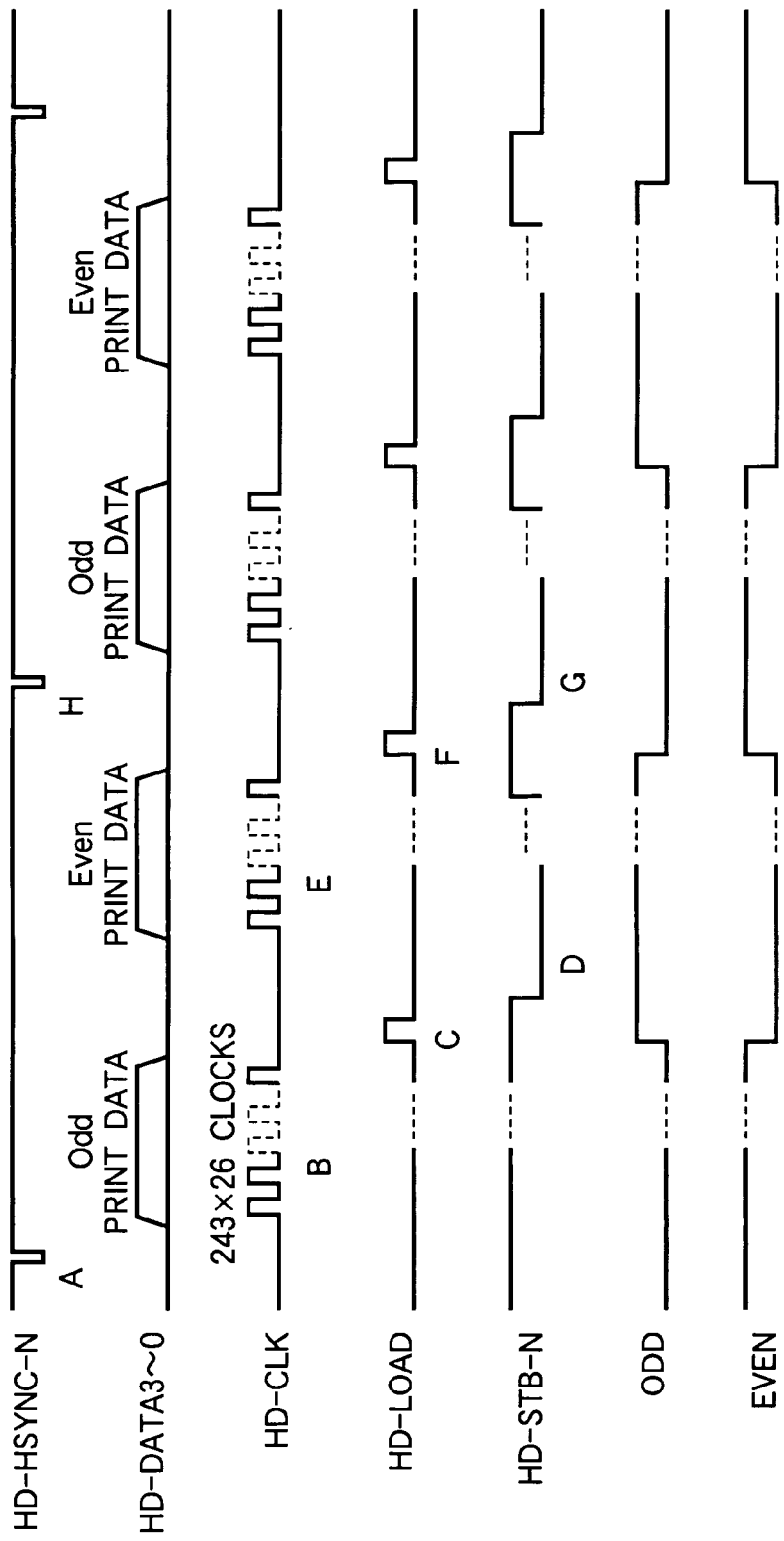
FIG. 14 is a timing chart illustrating the waveforms of various signals during the transfer of the print data shown in FIG. 13.

FIG. 14 is a timing chart illustrating the waveforms of various signals during the transfer of the print data shown in FIG. 13.

Prior to the driving of the LED at different timings, the main sync signals HD-HSYNC-N is input to the sync signal terminal HSYNC (portion "A"). Then, the print data signals HD-DATA3 to HD-DATA0 are input to the data terminals DATAI3 to DATAI0 on the clock signals HD-CLK inputted to the clock terminal CLK, thereby transferring the drive data for odd-numbered LEDs (print data for odd-numbered dots).

After completion of the data transfer for the odd-numbered dots at portion "B," the latch signal HD-LOAD-P is input to the latch terminal LOAD, thereby latching the data, which is held in the shift register 110 constituted of the flip flop FF 111A to flip flop FF 111D25, into the sub latching elements 131A1 to 131D24 of the latch circuit 130. Subsequently, the printing controlling signal HD-STB-N for causing the LEDs to be driven is inputted to the drive terminal STB at portion "D." Prior to this, the control terminal KDRV of the driver IC 100-1 outputs the control signal ODD to the PMOS transistor 211 (FIG. 5), thereby connecting the common cathodes of the odd-numbered LEDs to the ground GND or disconnecting the common cathodes of the LEDs from the ground GND. The control terminal KDRV of the driver IC 100-2 outputs the control signal EVEN to the PMOS transistor 212, thereby connecting the common cathodes of the even-numbered LEDs to the ground GND or disconnecting the common cathodes of the LEDs from the ground GND.

FIG. 14 illustrates both the control signals ODD and EVEN. The control signals ODD and EVEN are generated by a controlling circuit (not shown) in the driver ICs 100-1 and 100-2. Either the control signal ODD or EVEN is selected upon an ODD/EVEN selection commanding data stored in a memory circuit (not shown) having the same configuration as the sub memory circuits 151A1 to 151D24, and is outputted from the control terminals KDRV of the driver ICs 100-1 and 100-2 shown in FIG. 5.

{Details of Transfer of Dot Compensation Data}

FIGS. 15-18 are timing charts illustrating waveforms of the respective signals using one of the driver ICs 100-1, 100-2, ..., 100-26.

Figure 15:
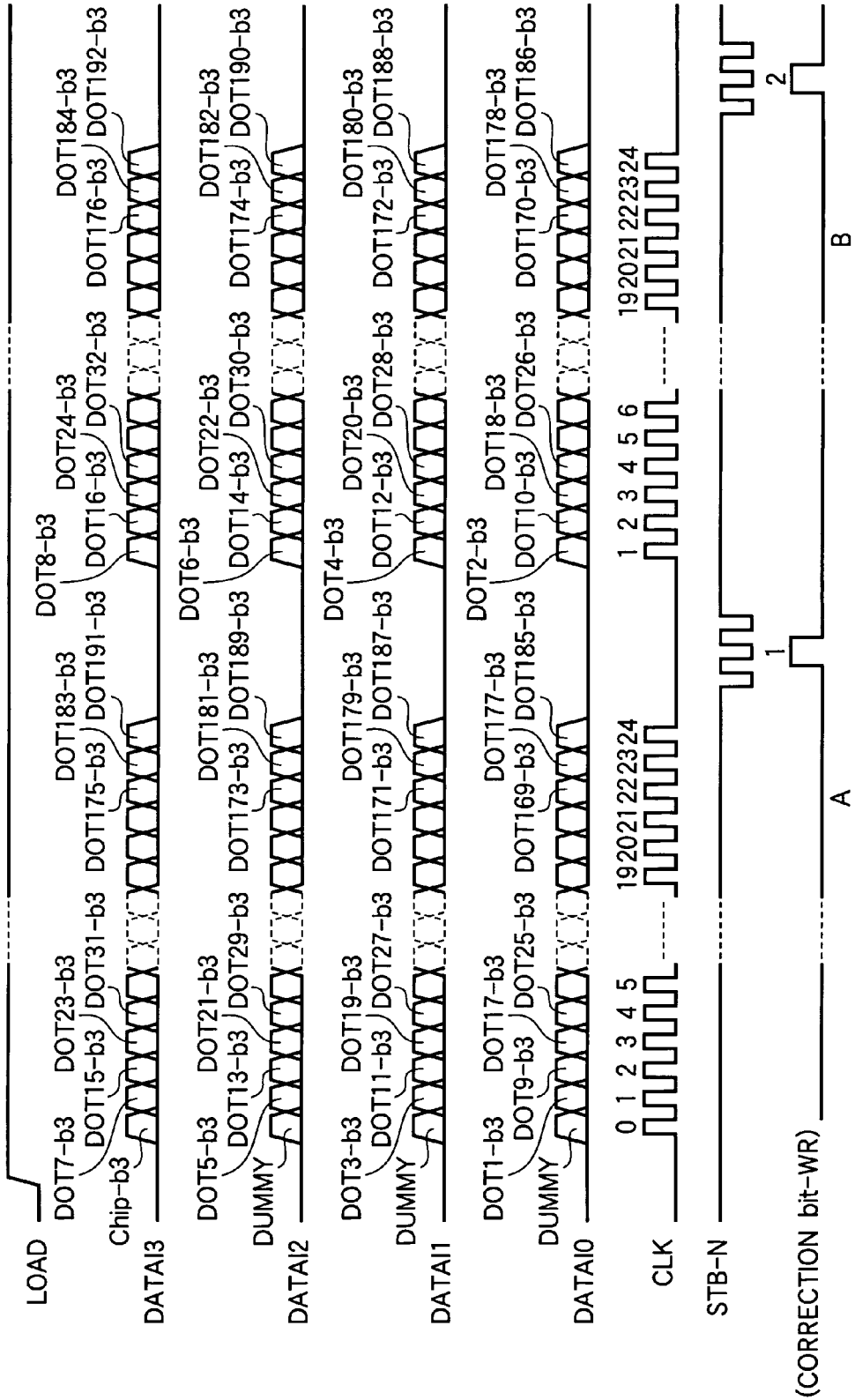
FIG. 15 illustrates the details of portions A and B shown in FIG. 13.
Figure 16:
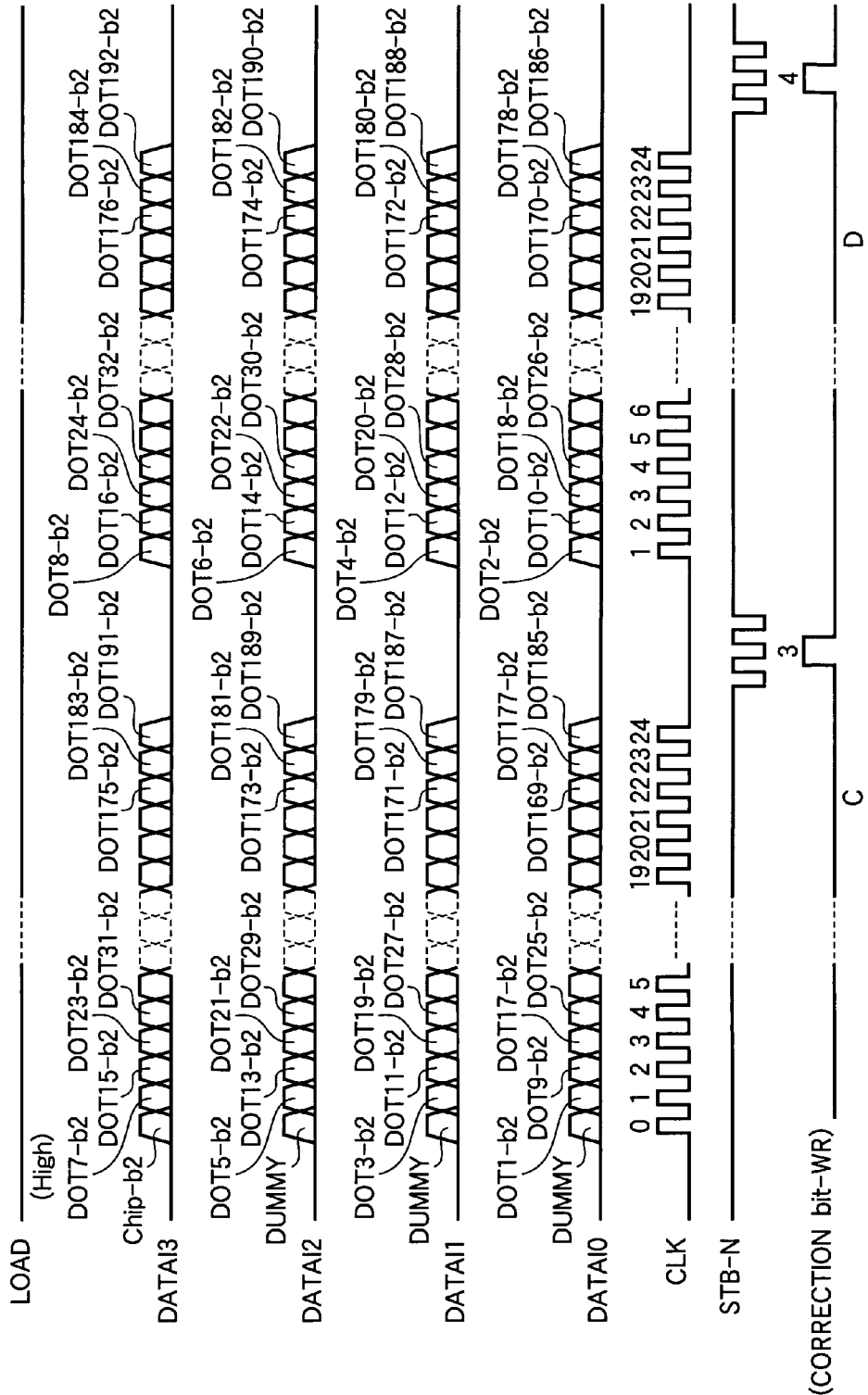
FIG. 16 illustrates the details of portions C and D shown in FIG. 13.
Figure 17:
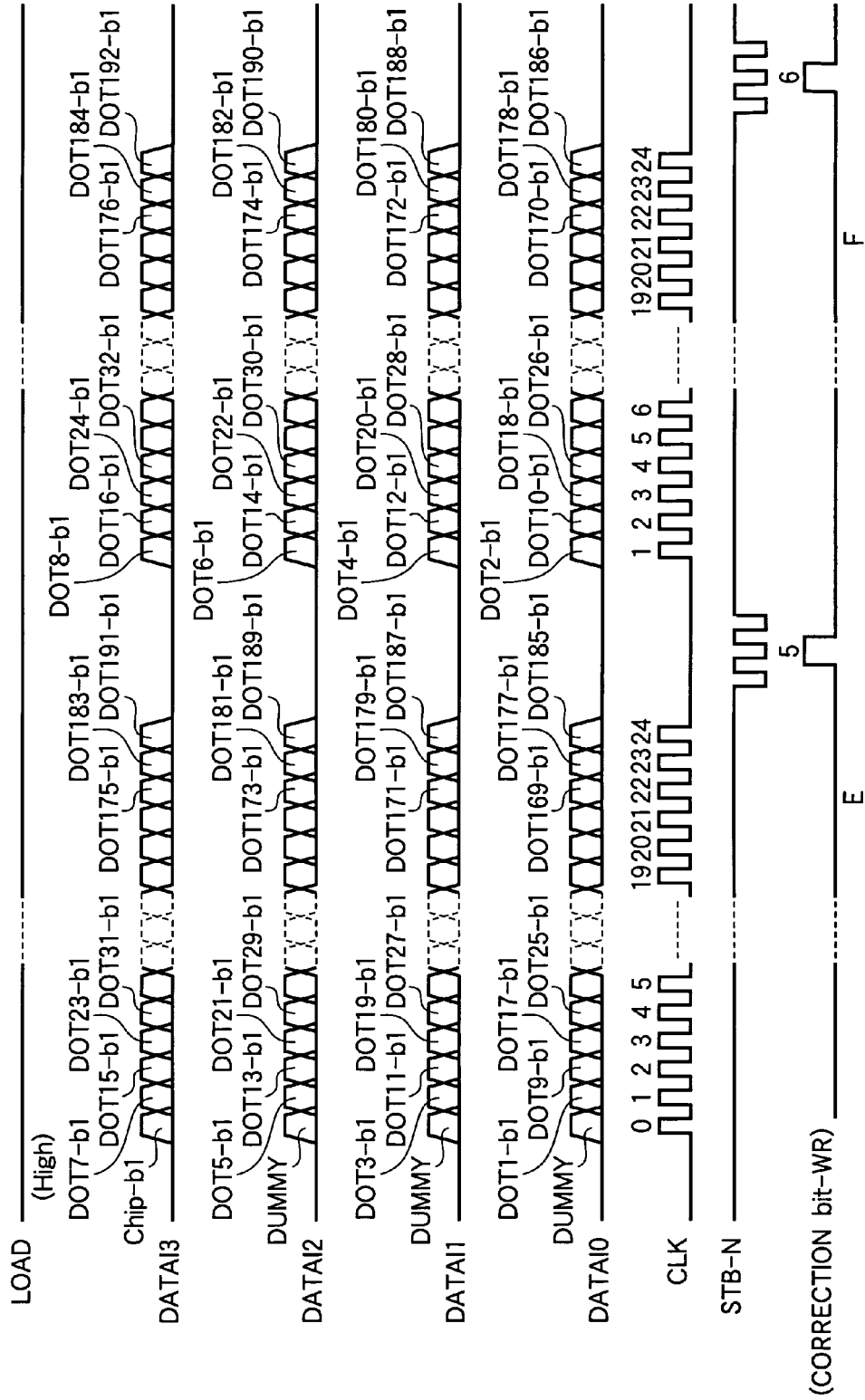
FIG. 17 illustrates the details of portions E and F shown in FIG. 13.
Figure 18:
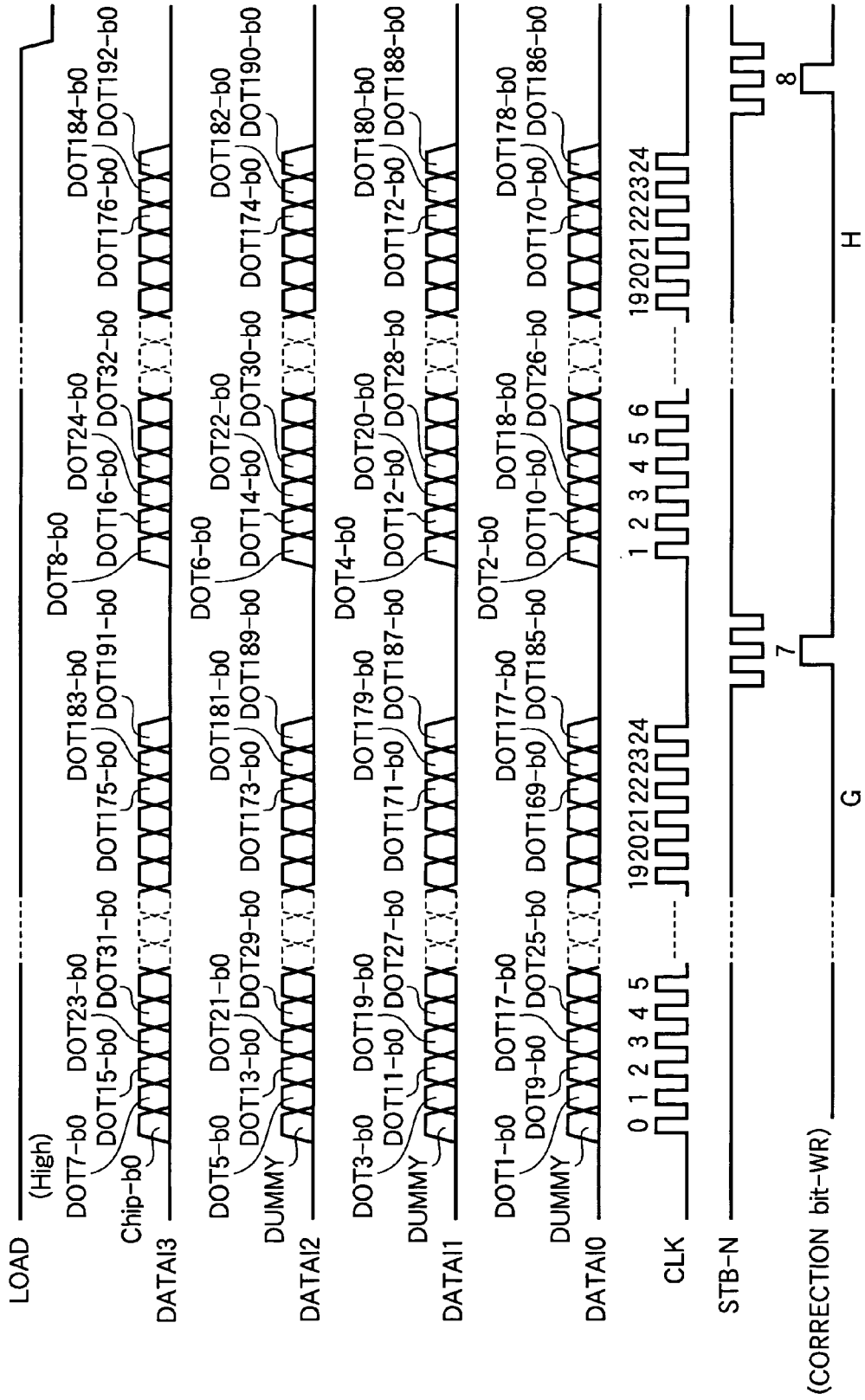
FIG. 18 illustrates the details of portions G and H.

FIG. 15 illustrates the details of portions A and B shown in FIG. 13. FIG. 16 illustrates the details of portions C and D shown in FIG. 13. FIG. 17 illustrates the details of portions E and F shown in FIG. 13. FIG. 18 illustrates the details of portions G and H.

The chip compensation data represents data that determines the light output (i.e., drive current of LEDs driven by a corresponding driver IC 100) and varies from driver IC to driver IC. The chip compensation data is 4-bit data consisting of Chip-b3 to Chip-b0. Referring to FIG. 15, the chip compensation data set for each driver IC 100 requires transfer of either odd-numbered dots (e.g., portion "A") or even-numbered dots (e.g., portion "B"). The Chip-b3 is inputted to the data receiving terminal DATAI 3 and then the dot compensation data for odd-numbered dots is inputted (portion "A" in FIG. 15). The Chip-b2 is inputted to the data receiving terminal DATAI 3 and then the dot compensation data for odd-numbered dots is inputted (portion "C" in FIG. 16). The Chip-b1 is inputted to the data receiving terminal DATAI 3 and then the dot compensation data for odd-numbered dots is inputted (portion "E" in FIG. 17). The Chip-b0 is inputted to the data receiving terminal DATAI 3 and then the dot compensation data for odd-numbered dots is inputted (portion "G" in FIG. 18).

For this purpose, the shift register 110 shown in FIGS. 15-18 has one more stage when the dot compensation data for the odd-numbered dots (portions A, C, E, G, etc.) is shifted than when the dot compensation data for the even-numbered dots is shifted. The chip compensation data (depicted at chip-b3, chip-b2, chip-b1, chip-b0) is added to the top of the string of data when the data is outputted from the printing controller 40.

{Operation of Memory Circuit}

Figure 19:
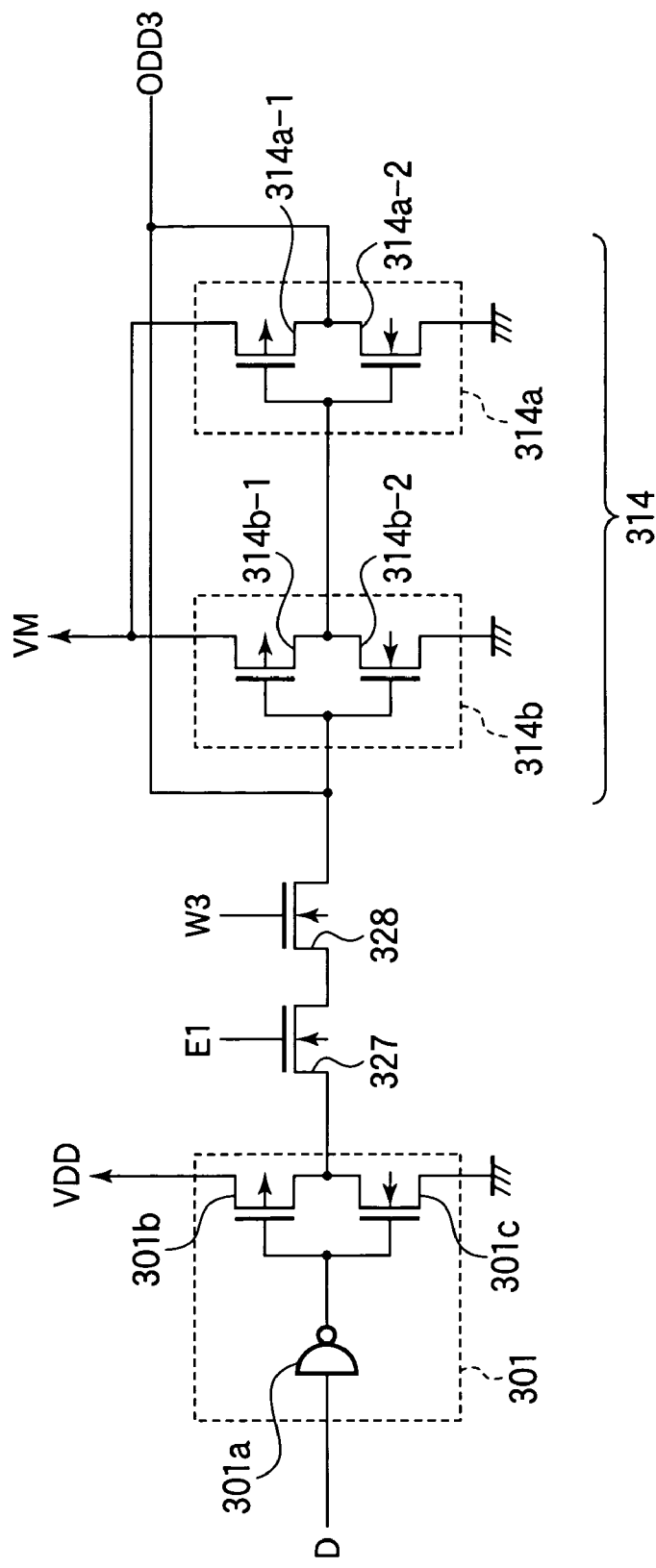
FIG. 19 illustrates the operation of the sub memory circuit shown in FIG. 1.

FIG. 19 illustrates the operation of the sub memory circuit 151A1 shown in FIG. 1, showing the vicinity of the compensation data terminal ODD3 shown in FIG. 1.

The compensation data terminals ODD2-ODD0 and EVN3-EVN0 are also of the same configuration as that shown in FIG. 19.

Referring to FIG. 19, the buffer 301 includes a cascaded configuration of an inverter 301a and a CMOS inverter that is constituted of a PMOS transistor 301b and an NMOS transistor 301c. The PMOS transistor 301b and NMOS transistor 301c are connected in series with each other between the supply voltage VDD (e.g. 5V) and the ground GND. An inverter 314a and an inverter 314b constitute a memory cell 314. The inverter 314a includes a PMOS transistor 314a-1 and an NMOS transistor 314a-2 connected in series between the supply terminal VM and the ground GND. The inverter 314b includes a PMOS transistor 314b-1 and an NMOS transistor 314b-2 connected in series between the supply terminals VM and the ground GND.

As described with reference to FIG. 13, the voltage applied to the supply terminal VM is approximately 3V during write cycle of the dot compensation data and approximately 5V during printing.

Figure 20:
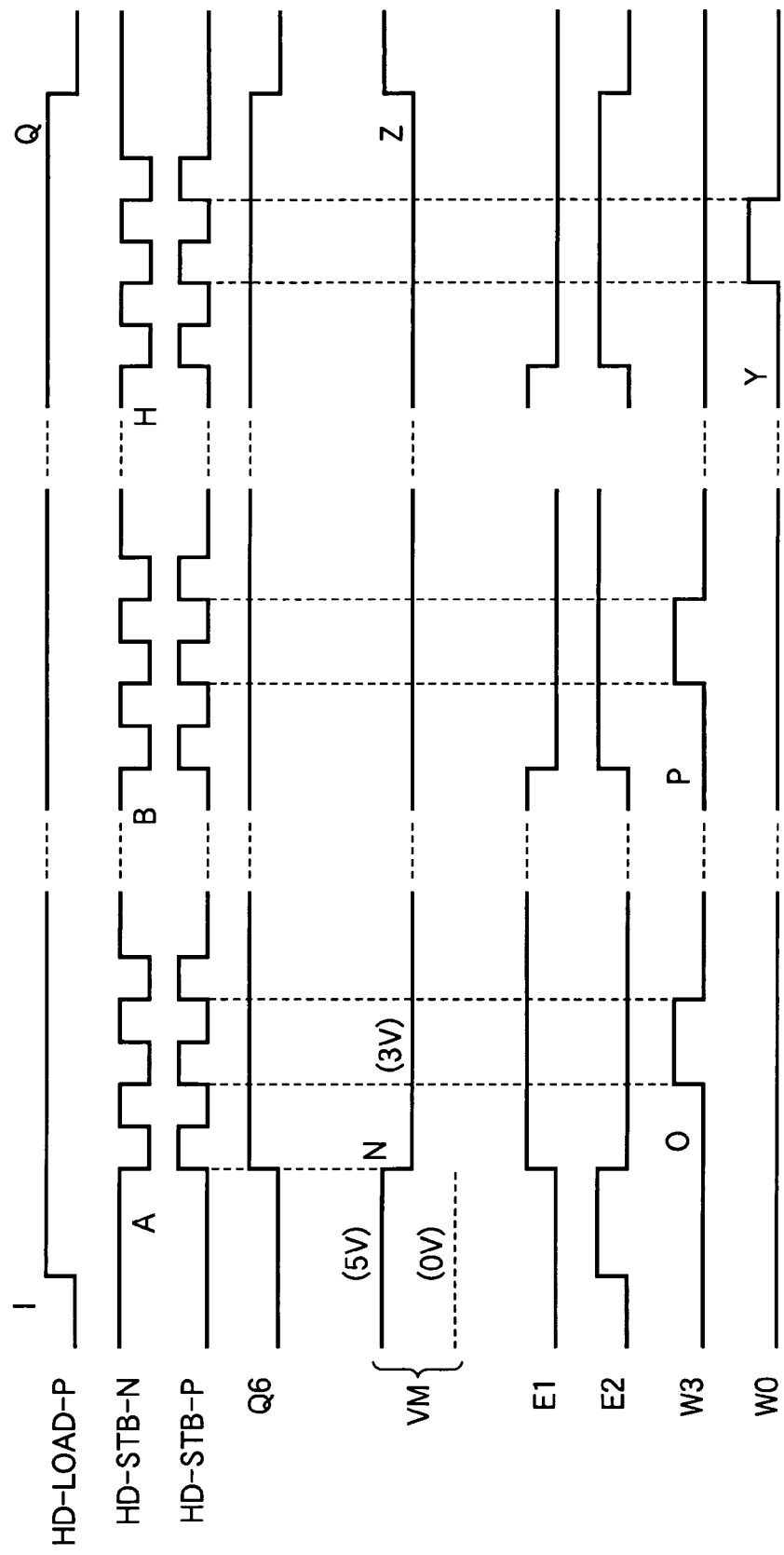
FIG. 20 is a timing chart illustrating the operation of the memory cells shown in FIG. 1 and the control circuit shown in FIG. 9.

FIG. 20 is a timing chart illustrating the operation of the memory cells shown in FIG. 1 and the memory controller 141 shown in FIG. 9. FIG. 20 illustrates the timings at which the odd-numbered dot (bit 3) of the dot dot compensation data is written into the memory cell, and shows the details of portions "I," "A," "B," "N," "O," and "P" shown in FIG. 13. A signal Q6 shown in FIG. 20 illustrates the waveform at the output terminal Q of the flip flop FF 369 shown in FIG. 9.

Referring to FIG. 20, when the transfer of the dot compensation data is initiated, the latch signal HD-LOAD-P at the latch terminal LOAD goes high "H" as depicted at portion "I." The "H" level of the latch signal HD-LOAD-P is directed to the reset terminals R of the flip flops FF 361-365 and 369, thereby bringing the flip flops FF 361-365 and 369 out of a reset state. Subsequently, the dot compensation data is transferred, which is not shown in FIG. 20.

Upon completion of the transfer of the dot compensation data to the compensation data terminal ODD3 (FIG. 19), three pulses (portion "A") of the print drive signal HD-STB-N are input to the drive terminal STB. The printing signal HD-STB-N is inverted in logic level by the inverter 144 shown in FIG. 6 to become the print drive signal HD-STB-P before being fed to the clock terminal CK of the flip flop FF 369 shown in FIG. 9. At this moment, the first falling edge of the print drive signal HD-STB-N causes the signal at the output terminal Q of the flip flop FF 369 to rise, the output terminal Q remaining at the "H" level till the print drive signal HD-STB-P goes low ("L" level).

The signal at the enable signal terminal E1 goes high ("H" level) on the rising edge of the first pulse of the print drive signals HD-STB-N at the portion "A" (FIG. 20). The signal appears at the memory cell selecting terminal W3 as depicted at portion "O" on the falling edge of the second pulse of the print drive signals HD-STB-N. At this moment, the signal at the enable signal terminal E1 is at the "H" level and the signals at the enable signal terminal E2 is at the "L" level, so that both the NMOS transistors 327 and 328 in the memory cell group 300-1 (FIG. 1) are turned on. Consequently, the output signal of the buffer 301 is fed to the inverter 314b in the memory cell 314, thereby writing the data.

When the next three pulses of the print drive signal HD-STB-N are inputted as depicted at portion "B" (FIG. 20), the signal at the enable signal terminal E1 goes low ("L"), and the signal at the enable signal terminal E2 goes high ("H"), thereby causing again the signal to appear at the memory cell selecting terminal W3 as depicted at portion "P." At this moment, one of the memory cells in the memory cell group 300-2 (FIG. 1) that corresponds to the compensation data terminal EVN3 is selected and the data is written into the selected memory cell.

{Comparison with Conventional Memory Circuit}

The memory circuit of the invention will be compared with the conventional memory circuit for understanding the operation of the sub memory circuit 151A1 shown in FIG. 1.

Figure 21:
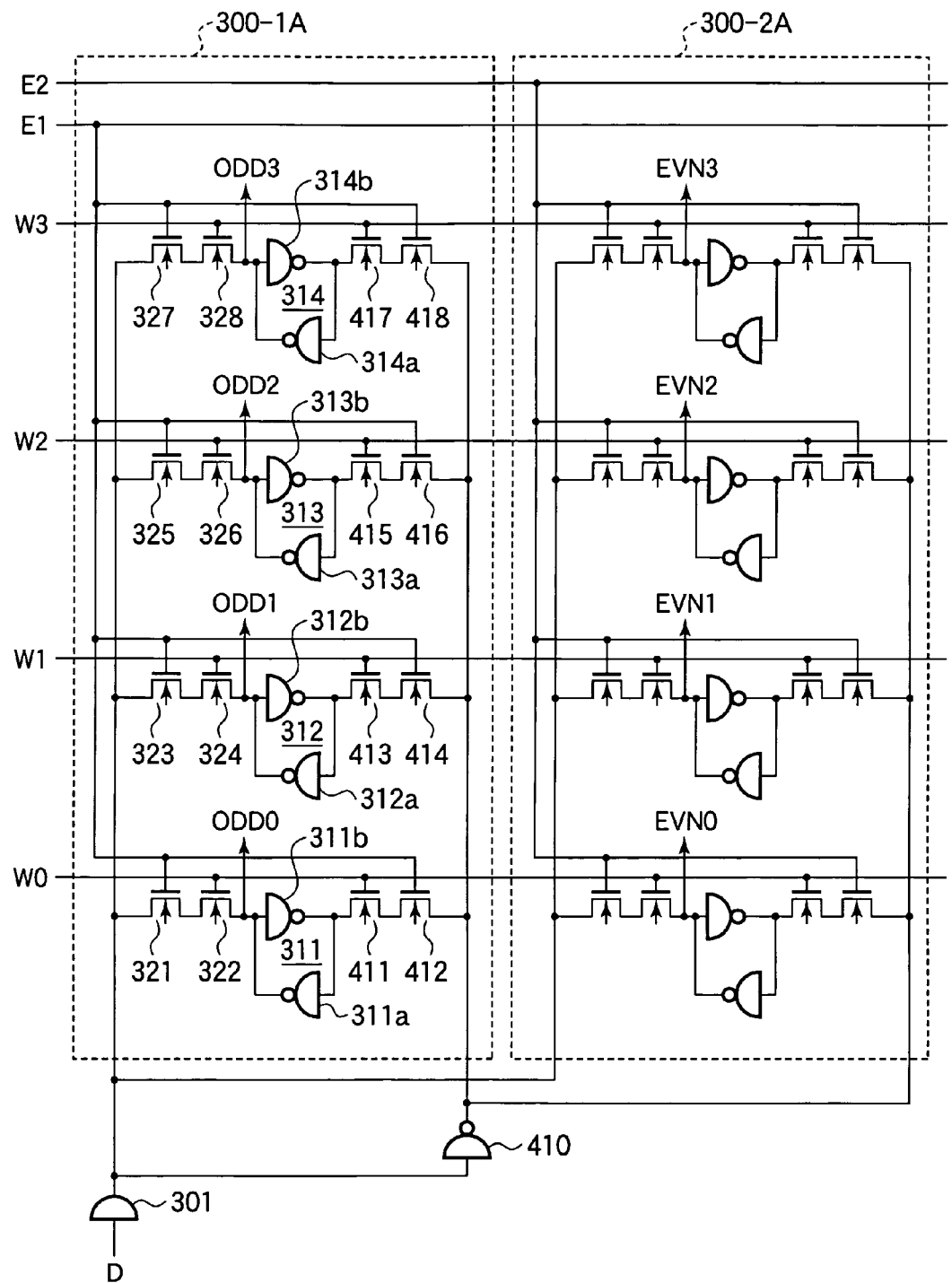
FIG. 21 is a schematic diagram illustrating the configuration of the conventional memory cell groups.

FIG. 21 is a schematic diagram illustrating the configuration of the conventional memory cell groups. Similar elements to those shown in FIG. 1 have been given the same reference numerals.

The conventional sub memory circuit includes memory cell groups 300-1A and 300-2A that correspond to the memory cell groups 300-1 and 300-2. The memory cell groups 300-1A and 300-2A have not the supply terminal VM of the first embodiment and have an additional inverter 410 at the output of the buffer 301. The inverter 410 is used for producing complementary dot compensation data. The compensation data terminal D at the input of the buffer 301 is connected to the output terminal Q of the flip flop FF 111A1 shown in FIG. 6.

The memory cell group 300-1A stores the dot compensation data for odd-numbered dots (e.g., dot #1) just as in the first embodiment, and includes NMOS transistors 321-328, memory cells 311-314 of the first embodiment, and additional NMOS transistors 411-418. The NMOS transistors 411 and 412 are connected in series between the output terminal of the inverter 410 and the memory cell 311, being controlled by the write control signals at their gates received from the memory cell selecting terminal W0. Therefore, the data can be written into the memory cell 311 from the NMOS transistors 321 and 322 of the first embodiment and also from the NMOS transistors 411 and 412.

Likewise, the NMOS transistors 413 and 414, which have their gates driven by the write control signal from the memory cell selecting terminal W1, are connected in series between the output terminals of the inverter 410 and the memory cell 312. The NMOS transistors 415 and 416, which have their gates driven by the write control signal from the memory cell selecting terminal W2, are connected in series between the output terminals of the inverters 410 and the memory cell 313. The NMOS transistors 417 and 418, which have their gates driven by the write control signal from the memory cell selecting terminal W3, are connected in series between the output terminals of the inverter 410 and the memory cell 314.

The memory cell group 300-2A stores the dot compensation data for even-numbered dots (e.g., dot #2) just as in the first embodiment, and is connected to the enable signal terminal E2 and to the compensation data terminals EVN0-EVN3.

The remaining portions of the conventional memory cell groups 300-1A and 300-2A are of substantially the same configuration as the memory cell groups 300-1 and 300-2 according to the first embodiment.

As is clear from FIG. 21, the memory cells 311-314 of the conventional memory cell groups 300-1A and 300-2A include ring-connected inverters 311a and 311b, 312a and 312b, 313a and 313b, and 314a and 314b. In other words, the output of the inverter 311a is connected to the input of the inverter 311b and the output of the inverter 311b is connected to the input of the inverter 311a. The output of the inverter 312a is connected to the input of the inverter 312b and the output of the inverter 312b is connected to the input of the inverter 311a. The output of the inverter 313a is connected to the input of the inverter 313b and the output of the inverter 313a is connected to the input of the inverter 313b. The output of the inverter 314a is connected to the input of the inverter 314b and the output of the inverter 314b is connected to the input of the inverter 314a. The memory cells 311-314 also have switching NMOS transistors 321-328 and 411-418 connected to the junctions of these inverters for the data write cycle. In contrast, the first embodiment employs only the NMOS transistors 321-328 does not employ the NMOS transistors 411-418 and the inverter 410 connected to the NMOS transistors 411-418.

The first embodiment solves the drawbacks of the conventional configuration shown in FIG. 21 in the following manner.

FIGS. 22A and 22B compare the memory cell of the conventional configuration with that of the first embodiment. FIG. 22A illustrates a pertinent portion of the conventional configuration and FIG. 22B illustrates the configuration of the first embodiment shown in FIG. 19. Transistors in the off state are depicted in dotted lines.

FIG. 22A illustrates the vicinity of the compensation data terminal ODD3 of the conventional art shown in FIG. 21, omitting elements (NMOS transistors 417 and 418) on a side of the inverter 314 opposite to the NMOS transistors 327 and 328 for convenience of illustration. The inverters 314a and 314b are connected to the VDD terminal which is typically at a constant 5 V.

In contrast, the inverters 314a and 314b of the first embodiment receive a supply voltage from the supply terminal VM whose voltage can be switched between about 3 V during the data write cycle and about 5 V after the data write cycle.

Assume that the inverters 314a and 314b shown in FIG. 22A receive the voltage of 5 V from the supply voltage VDD, and the "H" level of data is written into the inverter 314b.

The compensation data terminal D is at the "H" level, the "H" level (about 5 V) appears on the output terminal of the buffer 301, and the NMOS transistors 327 and 328 for writing the data are on. At this moment, the "H" level, which is nearly equal to the supply voltage VDD (about 5 V), appears on the enable signal terminal E1 and the memory selecting terminal W3. In order for the NMOS transistors 327 and 328 to turn on, the junction between the NMOS 328 and inverter 314b (i.e., compensation data terminal ODD3) can rise only up to a value given by VDD−(Vtn+ΔV) where Vtn is the threshold voltage of the NMOS transistors 327 and 328 and ΔV is the gate overdrive voltage. The voltage at the compensation data terminal ODD3 is typically approximately 3 V.

With this situation, the source of the PMOS transistor 314b-1 is at about 5 V (VDD) and the gate of the PMOS transistor 314b-1 is at about 3V, so that the gate source voltage Vgs is about 2 V and the PMOS transistor 314b-1 is turned on. As a result, the voltage at the output terminal of the inverter 314b becomes much higher than a desired "L" level, and is fed to the inverter 314a, causing the NMOS transistor 314a-2 to turn on. The voltage at the compensation data terminal ODD3 is decreased by the NOMS transistor 314a-2, which makes it more difficult to ensure a sufficient "H" level.

As described above, the conventional memory circuit shown in FIG. 21 has less number of parts by eliminating the NMOS transistors 411-418 but may suffer from difficulty in writing data.

In contrast, the inverters 314a and 314b according to the first embodiment (FIG. 22B), is connected to the supply terminal VM which is configured to switch between about 3 V during data write cycle and about 5 V after the data write cycle.

The output of the buffer 301 is at about 5 V and the compensation data terminal ODD3 is about 3 V. At this moment, the supply voltage (VM) of the inverters 314a and 314b is 3 V and the gate-to-source voltage of the PMOS transistor 314b-1 is about 0 V, which is lower than the threshold voltage Vtp, so that the PMOS transistor 314b-1 is off. At this moment, the NMOS transistor 314b-2 is on and its source voltage is about 0 V causing the NMOS transistor 314a-2 to turn off.

As described above, the PMOS transistor 314b-1 and NMOS transistor 314a-2 are off and are shown in dotted lines in FIG. 22B. At this moment, the PMOS transistor 314a-1 is on to cause the voltage at the compensation data terminal ODD3 to increase to the voltage of the supply terminal VM (about 3 V), thereby ensuring that the compensation data terminal ODD3 is "H" when the NMOS transistors 327 and 328 are on.

Referring to FIG. 22B, the NMOS transistor 314b-2 and PMOS transistor 314a-1 are ON, and the signals on the compensation data terminal ODD3 is at the "H" level which is approximately 3 V, equal to the voltage at the supply terminal VM. Upon completion of the data write cycle, the voltage at the supply terminal VM returns to 5 V, the signal at the compensation data terminal ODD3 follows the voltage at the supply terminal VM, reaching approximately 5 V, that is, substantially equal to the supply voltage VDD for the buffer

301. This operation is substantially the same as the conventional configuration shown in FIG. 22A.

Thus, the sub memory circuit 151A1 of the first embodiment requires much less number of parts than the conventional memory circuit shown in FIG. 21, but operates just as in the conventional memory circuit while preventing the signals on the compensation data terminal ODD3 from being insufficiently high level which would otherwise be caused by the conventional configuration shown in FIG. 22A.

{Effects of First Embodiment}

The first embodiment provides the following effects.

The first embodiment provides a high quality image forming apparatus (printer, copying machine, facsimile machine, and MFP) that employs the LED head 13 which is space-saving and efficient in emitting light. The LED head 13 may be applicable to both a monochrome image forming apparatus and a multicolor image forming apparatus, and may be particularly effective in a full-color image forming apparatus which employs a plurality of exposing units.

The LED head 13 includes, for example, 4992 LEDs. The light output of each LED requires to be corrected with 4-bit dot compensation data, and therefore memory cells 311-314, . . . 20279 are constituted of a total of 4992×4=19968 bits. The memory cell groups shown in FIG. 21 according to the conventional LED driver IC requires the following signals and operations.

(1) The data is written into the memory cells 311-314, . . . , 20279 using the memory cell selecting terminals W3-W0 indicative of the locations of bits, the signal at the enable signal terminal E1 indicative of odd-numbered dots, and the signal at the enable signal terminal E2 indicative of even-numbered dots.

(2) The NMOS transistors 411-418 are required which are controlled by the memory cell selecting signal W3-W0 and the enable signals E1 and E2.

(3) Two data lines are required which are connected to the output terminals of the buffer 301 and inverter 410 and have opposite logic levels.

The number of elements for driving the NMOS transistors 411-418 is not negligible and requires a large chip area for integrating the driver ICs 100-1, 100-2, . . . , 100-26. The number of chips obtained from an IC wafer and chip yield decreases, causing an increase in IC manufacturing cost. This is detrimental to cost reduction of the LED head 13 that employs these memory cell circuits.

Comparison of the conventional memory circuit (FIG. 21) with the sub memory circuit 151A1 reveals that the configuration of the first embodiment (FIG. 1) differs from the conventional memory circuit in that the inverter 410 and the NMOS transistors 417, 418 . . . 412 (i.e., 2×4=8 NMOS transistors) connected to the data lines on the output side of the inverter 410 can be eliminated. The inverter 410 requires two transistors. This implies that a total 18 (=2+2×4×2) transistors can be eliminated.

As described above, the LED head 13 employs 4992 LEDs and the sub memory circuits 151A1-151D24 for performing correction of light output for each LED. For this purpose, 2496 (=4992÷2) sub memory circuits 151A1 (FIG. 1) are required. Therefore, the first embodiment eliminates 44928 (=18×2496) transistors for the entire LED head 13, reducing the area which would otherwise be occupied by the transistors, and hence the IC manufacturing cost.

{Modification to First Embodiment}

Figure 23:
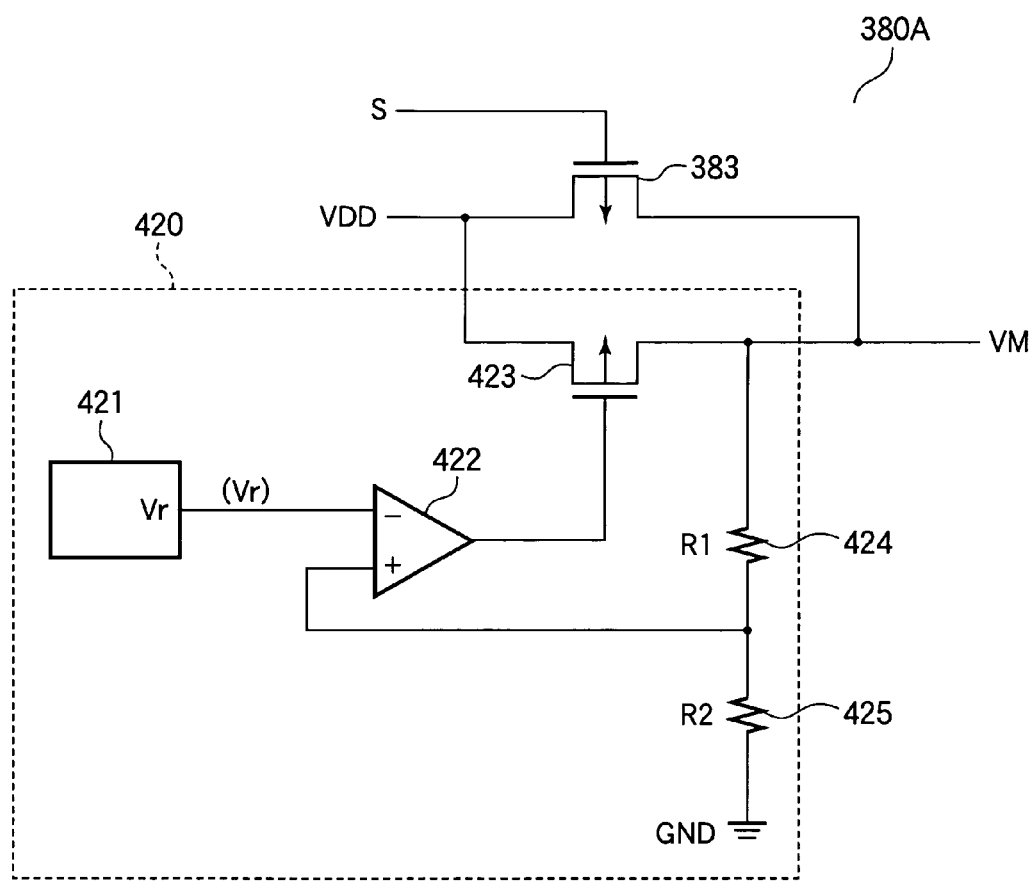
FIG. 23 is a schematic diagram illustrating the modification to the voltage level shifter shown in FIG. 10.

FIG. 23 is a schematic diagram illustrating the modification to the voltage level shifter 380 shown in FIG. 10. Elements similar to those shown in FIG. 10 have been given the same references.

The modified voltage level shifter 380A includes a PMOS transistor 383 shown in FIG. 10 and a voltage level shifter 420 that replaces the PMOS transistor 381 and the resistor 382 shown in FIG. 10.

The PMOS transistor 383 is driven by the voltage at the input terminal S to connect the VDD terminal to the supply terminal VM or disconnect the VDD terminal from the supply terminal VM. The voltage level shifter 420 is connected in parallel with the source-drain of the PMOS transistor 383.

The voltage level shifter 420 includes a reference voltage circuit 421 that outputs a reference voltage Vr. The output of the reference voltage circuit 421 is connected to an inverted input terminal of an OP amp 422. The output of the OP amp 422 is connected to the gate of the PMOS transistor 423. The source-drain of the PMOS transistor 423 is connected in parallel with the source-drain of the PMOS transistor 383, and the drains of the PMOS transistors 383 and 423 are connected to the supply terminal VM and to the ground GND through a resistor 424 having a resistance of R1 and a resistor 425 having a resistance of R2. The junction between the resistors 424 and 425 is connected to a non-inverted input terminal of the OP amp 422.

When the input terminal S of the voltage level shifter 380A is at the "L" level, the PMOS transistor 383 is on, so that the output voltage on the supply terminal VM becomes substantially the same as the supply voltage VDD just as in the voltage level shifter 380 shown in FIG. 10.

When the signal at the input terminal S is at the "H" level, the PMOS transistor 383 is off and feedback control is performed so that the voltage at the supply terminal VM divided by the resistors 424 and 425 is equal to the reference voltage Vr at the inverted input terminal of the OP amp 422. Thus, the VM and Vr are related as follows:

$$(\text{Voltage at } VM) \times R2/(R1+R2) = Vr$$

or $$\text{Voltage at } VM = Vr \times (1+R1/R2)$$

For example, if Vr=1.25 V, R1=14 kΩ, and R2=10 kΩ, then the voltage at the supply terminal VM is 3 V. This implies that the output voltage at the supply terminal VM may be switched between 5 V and 3 V depending on the signal level at the input terminal S.

The voltage level shifter 380A shown in FIG. 23 operates in the same way as the voltage level shiftier 380 shown in FIG. 10. The voltage of the supply terminal VM may be changed by adjusting the ratio of R1 to R2, thereby providing design flexibility of the voltage level shifter 380A.

Second Embodiment

{Configuration}

Figure 24:
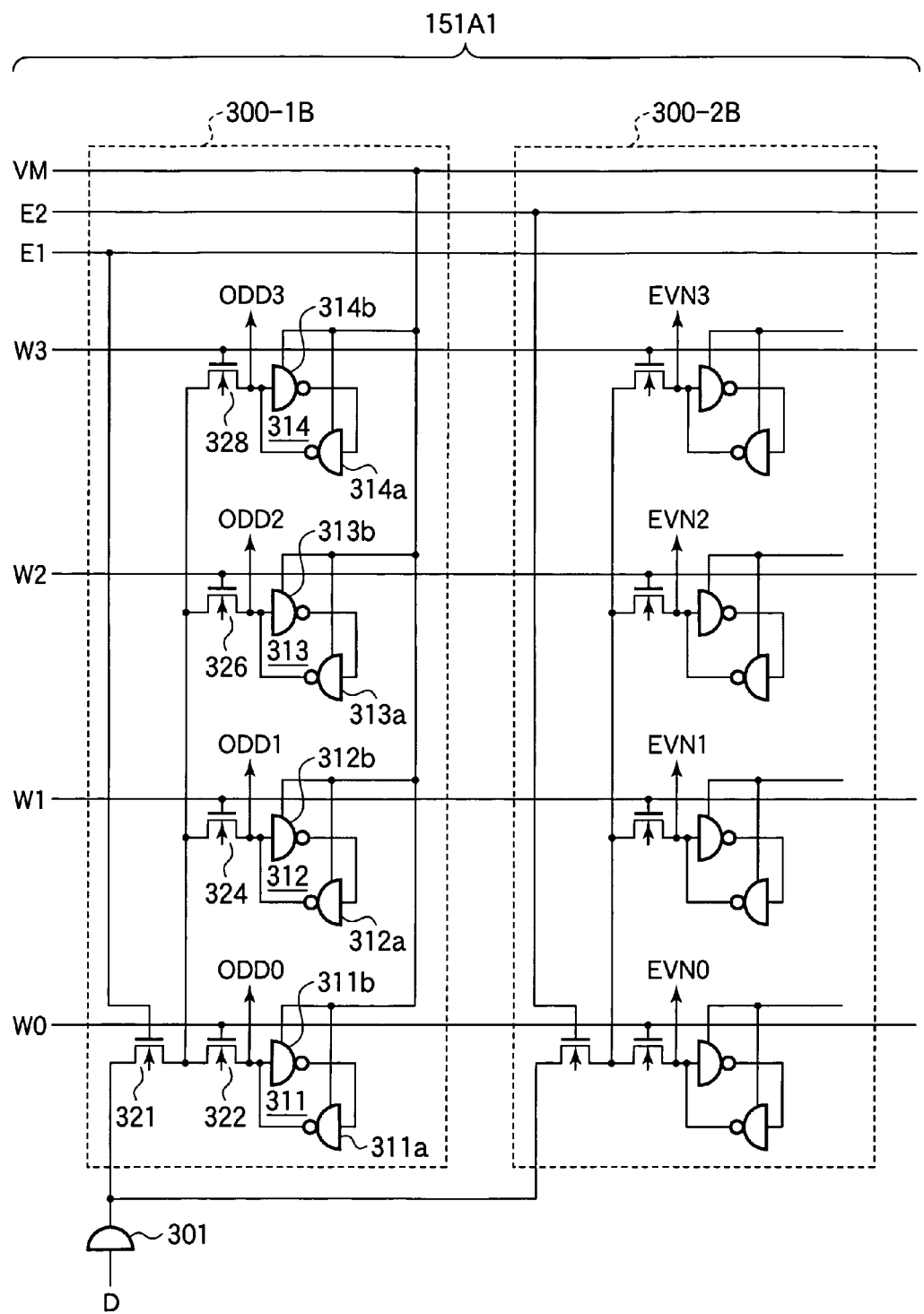
FIG. 24 is a schematic diagram illustrating the configuration of the sub memory circuit of a second embodiment.

FIG. 24 is a schematic diagram illustrating the configuration of the sub memory circuit 151A1 of a second embodiment. Elements similar to those of the sub memory circuit 151A1 (FIG. 1) have been given the same references.

The sub memory circuit 151A1 of the second embodiment corresponds to one of the sub memory circuits shown in FIG. 6. Just as in the first embodiment, dot dot compensation data for correcting the light output of each LED is 4-bit data. The 4-bit data provides adjustment of LED drive current in 16 increments for each dot, thereby correcting the light output of the LED.

The sub memory circuit 151A1 of the second embodiment includes two adjacent memory cell groups: a memory cell group 300-1B and a memory cell group 300-2B. The memory cell groups 300-1B and 300-2B differ in configuration from the memory cell groups 300-1 and 300-2 according to the first embodiment. Just as in the first embodiment, the memory cell group 300-1B stores dot compensation data for odd-numbered dots (e.g., dot #1) and the memory cell group 300-2B stores dot compensation data for even-numbered dots (e.g., data #2).

The memory cell group 300-1B differs from the memory cell group 300-1 (FIG. 1) in that NMOS transistors 323, 325, and 327 are not used and the junction point of the NMOS transistor (first switch) 321 and NMOS, transistor (second switch) 322 is connected to respective memory cells 312, 313, and 314 through NMOS transistors 324, 326, and 328, respectively.

The memory cell group 300-2B has the same configuration as the memory cell group 300-1B except that the memory cell group 300-2B is connected to the enable signal terminal E2 and the memory cells are connected to the compensation data terminals EVN0-EVN3. The remaining configuration of the sub memory circuit 151A1 is the same as that of the first embodiment.

{Operation}

Figure 25:
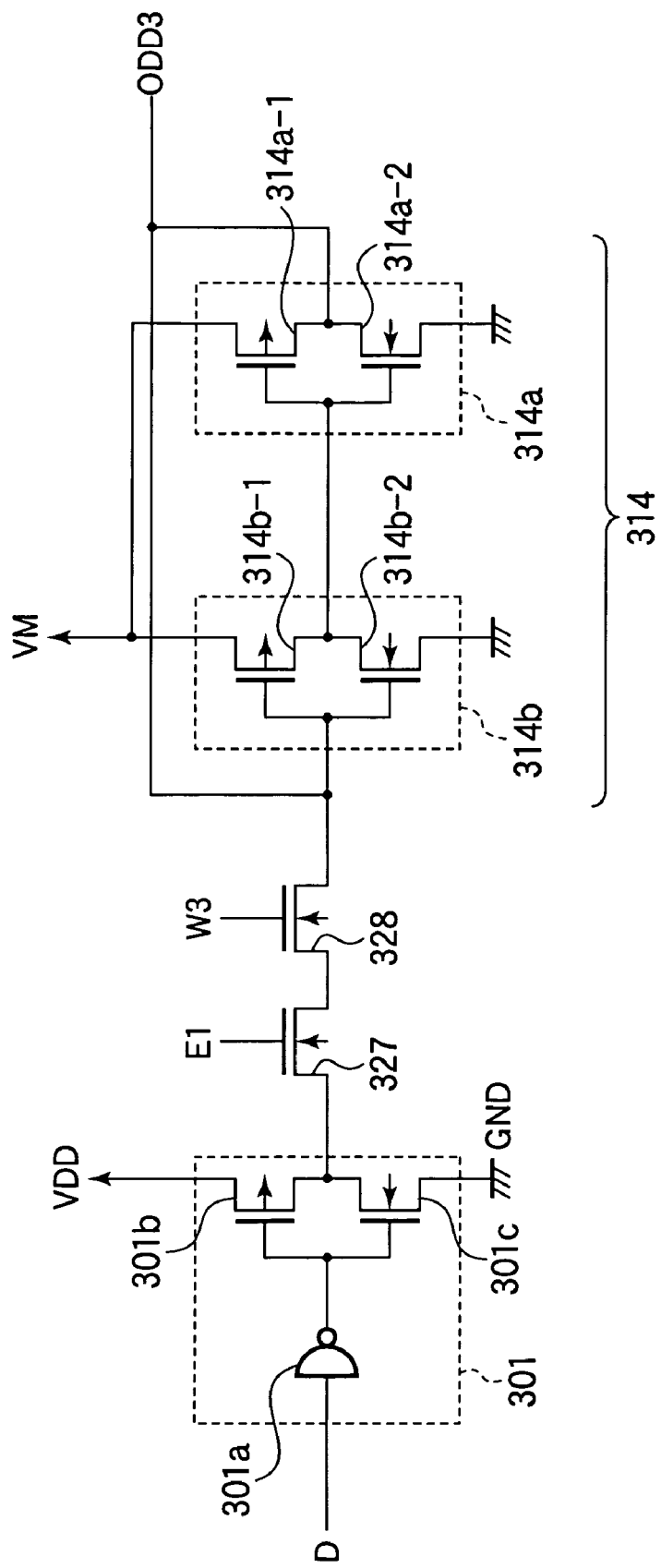
FIG. 25 illustrates the operation of the sub memory circuit shown in FIG. 24.

FIG. 25 illustrates the operation of the sub memory circuit 151A1 shown in FIG. 24, and shows the vicinity of the compensation data terminal ODD3 shown in FIG. 24.

The compensation data terminals ODD2-ODD0 and EVN3-EVN0 are of the same configuration as the compensation data terminal ODD3.

The compensation data terminal D shown in FIG. 25 is connected to an input terminal of a buffer 301 or a data feeding means. The buffer 301 includes an inverter 301a and a CMOS inverter which are connected in cascade. The CMOS inverter includes PMOS transistors 301b and 301c connected in series between the supply terminal VDD (e.g., 5 V) and the ground GND. The output of the buffer 301 is connected to the compensation data terminal ODD3 and memory cell 314 via NMOS transistors 328 and 321. The NMOS transistor 328 is turned on and off by the write control signal fed from the memory cell selecting terminal W3 and the NMOS transistor 321 is turned on and off by the write enable signal fed from the enable signal terminal E1.

The inverter 314a is a CMOS inverter formed of the PMOS transistor 314a-1 and the NMOS transistor 314a-2 connected in series between the supply terminal VM and the ground GND. The voltage applied to the supply terminal VM is about 3 V during a data write cycle and about 5 V during printing as shown in FIG. 13. Likewise, the inverter 314b is a CMOS inverter formed of the PMOS transistor 314b-1 and an NMOS transistor 314b-2 connected in series between the supply terminal VM and the ground GND.

The operation of the sub memory circuit 151A1 shown in FIGS. 24 and 25 will be described referring to FIG. 20 as required.

Referring back to FIG. 20, prior to the initiation of transfer of the dot compensation data, the latch signal HD-LOAD-P at the latch terminal LOAD is at the "H" level as depicted at portion "I." Thus, the latch signal HD-LOAD-P is directed to the rest terminal R of the flip flops FFs 361-365 and 369 shown in FIG. 9, bringing these flip flops out of the reset state. Subsequently, the dot compensation data is transferred from the compensation data terminal ODD, but this transfer operation is omitted from FIG. 20.

Upon completion of the transfer of the dot compensation data from the compensation data terminal ODD3, three pulses of the print drive signal HD-STB-N are inputted to the drive terminal STB (portion "A"). The print drive signal HD-STB-N is inverted in logical level into the print drive signal HD-STB-P by the inverter 144 shown in FIG. 6, and is then inputted to the clock terminal CK of the FF 369 shown in FIG. 9. At this moment, the signal at the output terminal Q6 of the flip flop FF 369 rises on the falling edge of the first pulse of the print drive signal HD-STB-N, and remains high until the latch signal HD-LOAD-P goes low ("L"), as depicted at portion "Q" shown in FIG. 20.

The write enable signal inputted to the enable signal terminal E1 goes high on the rising edge of the first pulse of the print drive signal HD-STB-N at portion "A." This causes the NMOS transistor 321 shown in FIGS. 24 and 25 to turn on. Then, the falling edge of the second pulse of the print drive signal HD-STB-N causes the write control signal to appear at the memory cell selecting terminal W3 as depicted at "O" shown in FIG. 20. At this moment, the write enable signal at the enable signal terminal E1 is at the "H" level and the write enable signal at the enable signal E2 is at the "L" level, so both the NMOS transistors 321 and 328 shown in FIGS. 24 and 25 are turned on. Thus, the output signal of the buffer 301 is fed to the inverter 314b, thereby writing the data.

In another case, when the next three pulses of the print drive signal HD-STB-N are inputted to the drive terminal STB (portion "B" in FIG. 20), the write enable signal at the enable signal terminal E1 goes low ("L" level), and the write enable signal at the enable signal terminal E2 goes high ("H" level), thereby causing the write control signal to appear again at the memory cell selecting terminal W3 as depicted at portion "P." At this moment, a memory cell in the memory cell group 300-2B (FIG. 24) corresponding to the compensation data terminal EVN3 is selected, and the data is written into the memory cell.

{Effects of Second Embodiment}

The second embodiment provides the following effects in addition to those obtained from the first embodiment.

The sub memory circuit 151A1 as shown in FIG. 24 differs from the conventional sub memory circuit as follows: The second embodiment eliminates the inverter 410 and the NMOS transistors 411-418 connected to the output of the inverter 410, saving 2×4=8 devices. The cells share a common NMOS transistor 321 that is connected to the enable signal terminal E1, eliminating three NMOS transistors 323, 325, and 327 shown in FIG. 21. Likewise, the cells share a common NMOS transistor that is connected to the enable signal terminal E2, eliminating additional three NMOS transistors. The inverter 410 requires two transistors shown in FIG. 21. Therefore, the second embodiment eliminates a total of 24 (=2+(2×4+3)) transistors.

As described above, the LED head 13 requires 4992 LEDs and a memory circuit 150 for correcting the light output of each LED. The memory circuit 150 requires 2496 (=4992/2) sub memory circuits having the configuration shown in FIG. 24. The use of the sub memory circuits according to the second embodiment eliminates a total of 59904 (=2496×24) transistors for the LED head 13. This implies that the area of an IC chip occupied by these transistors is not required, leading to great reduction of the manufacturing cost.

{Modification to Second Embodiment}

Figure 26:
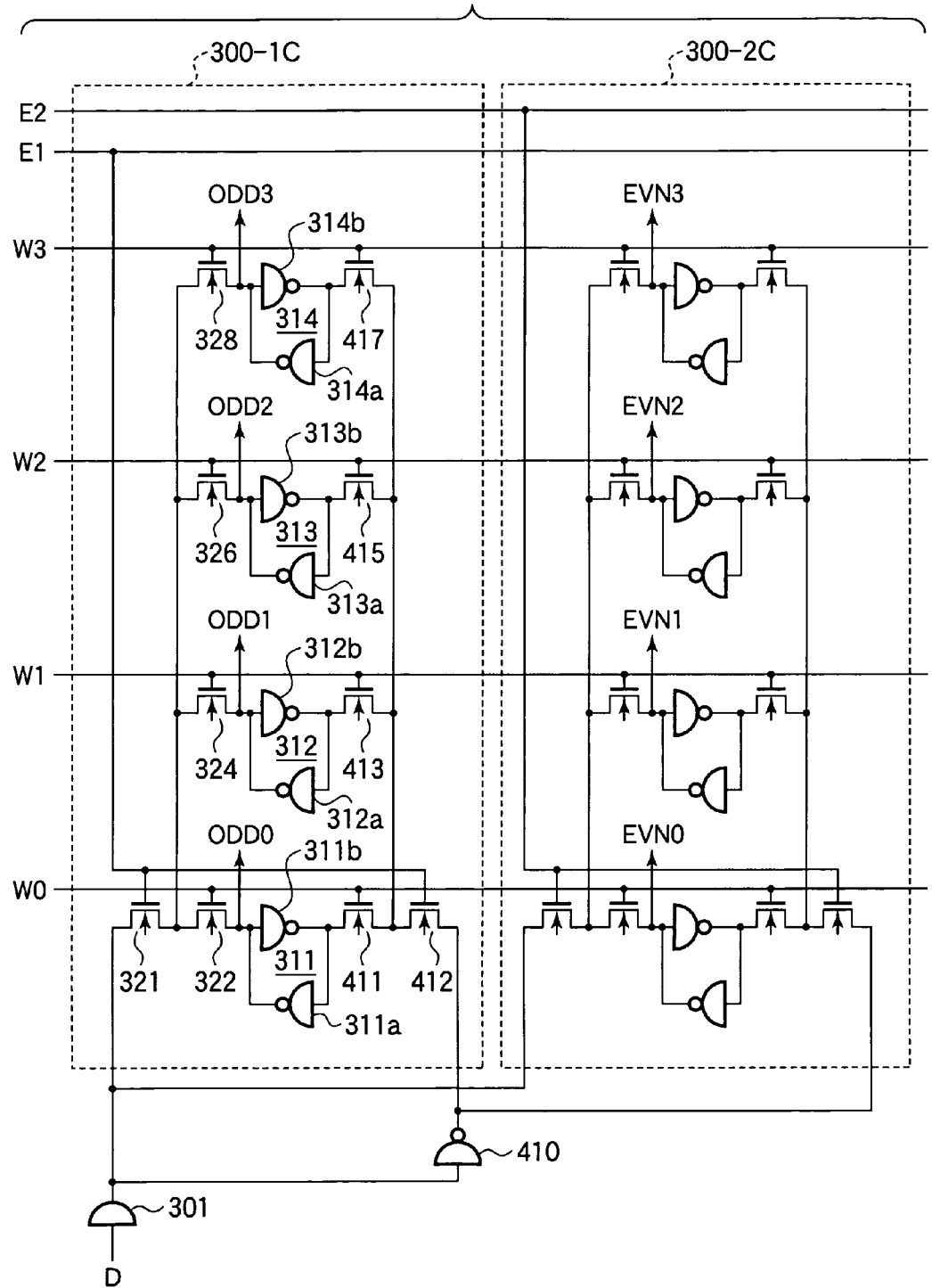
FIG. 26 illustrates a modification to the sub memory circuit shown in FIG. 24 according to the second embodiment.

FIG. 26 illustrates a modification to the sub memory circuit 151A1 shown in FIG. 24 according to the second embodiment. Elements similar to those of the second embodiment and the conventional art have been given like references.

The sub memory circuit 151A1 shown in FIG. 26 includes memory cell groups 300-1C and 300-2C whose portions have been replaced by the memory cell groups 300-1B and 300-2B according to the second embodiment.

The memory cell groups 300-1C and 300-2C have not the supply terminal VM according to the second embodiment. The output of the buffer 301, which is a first data feeding means in the second embodiment, is connected to the inverter 410 which is a second data feeding means for producing complementary dot compensation data just as in the conventional art. The data outputted from the inverter 410 and the data outputted from the buffer 301 have opposite logic levels. The compensation data terminal D at the input of the buffer 301 is connected to the output terminal Q of the flip flop FF 111A1 shown in FIG. 6.

The memory cell group 300-1C stores the dot compensation data for odd-numbered dots (e.g., dot #1) and includes a first switch or the NMOS transistor 321, second switches or NMOS transistors 322, 324, 326, and 328, memory means or memory cells 311-314, fourth switches or the NMOS transistors 411, 413, 415, 417 and a third switch or the NMOS transistor 412. The NMOS transistor 411 whose gate is controlled by the write control signal received at the memory cell selecting terminal W0, and the NMOS 412 whose gate is controlled by the enable signal received at the enable signal terminal E1 are connected in series between the output of the inverter 410 and the memory cell 311. This configuration permits data to be written into the memory cell 311 via the NMOS transistors 321 and 322 according to the second embodiment as well as via the NMOS transistors 411 and 412.

The junction point of the NMOS transistor 411 and NMOS transistor 412 is connected to respective memory cells 312, 313, and 314 through the NMOS transistors 413, 415, and 417, respectively. The NMOS transistors 413, 415, and 417 are controlled by the write control signal received at the memory cell selecting terminals W0-W3.

The memory cell group 300-2C stores the dot compensation data for even-numbered dots (e.g., dot #2). The memory cell group 300-2C is connected to the enable signal terminal E2 and the compensation data terminals EVN0-EVN3. The remaining portion of the memory cell group 300-2C are substantially the same as that of the memory cell group 300-1C.

The remaining portion of the memory cell groups 300-1C and 300-2C shown in FIG. 26 is substantially the same as those of the memory cell groups 300-1B and 300-2B according to the second embodiment.

The conventional cell circuits 300-1A and 300-2A include memory cells 311-314 in the form of two inverters connected to form a ring, and NMOS transistors 411, 412 . . . 418 connected in series with the ring-connected inverters. The NMOS transistors 411 and 412 serve as a closed switch during the data write cycle. In contrast, the modification shown in FIG. 26 employs a single switching NMOS transistor common to all of the memory cells. This permits the memory circuit to operate just as the conventional configuration shown in FIG. 21 though the NMOS transistors are reduced in number.

{Other Modifications}

Modifications may be further made to the first and second embodiments as follows:

The light emitting elements according to the present invention have been described with respect to LEDs. The invention is not limited to this and may be applicable to elements (e.g., organic EL light emitting elements and heat generating elements) to which voltage is applied controllably. For example, the invention may be applied to a printer equipped with an organic EL head and a thermal printer equipped with heat generating elements. Further, the invention may be applied to drive a display apparatus (e.g., display elements arranged in a line or a matrix).

The present invention may be applicable not only to 2-port elements such as LEDs but also to 3-port elements such as light emitting thyristors and 4-port elements (Silicon Semiconductor Controller Switch or SCS) which have first and second gates.

The present invention may be applied not only to a driver for a row of elements of the same configuration but also to IC chips having a plurality of drive terminals.

The invention being thus described, it will be obvious that the same may be varied in many ways. Such variations are not to be regarded as a departure from the scope of the invention, and all such modifications as would be obvious to one skilled in the art are intended to be included within the scope of the following claims.

What is claimed is:

1. A driver circuit, comprising:
a memory cell including a single data terminal, the memory cell configured to receive data for driving an element via a single data line and then store the data therein, the memory cell being formed of a first inverter having a first output terminal and a first input terminal and a second inverter having a second output terminal and a second input terminal, the first output terminal being connected to the second input terminal and the second output terminal being connected to the first input terminal;
a series circuit of a first switch and a second switch, the series circuit being located in the single data line and connected to the single data terminal so that the data is directed into the memory cell through the series circuit; and
a supply voltage controller for supplying a first supply voltage to the first inverter and second inverter while the data is being written into the memory cell and a second supply voltage to the first inverter and second inverter after the data has been written into the memory cell.

2. The driver circuit according to claim 1, wherein the first supply voltage is lower than the second supply voltage.

3. The driver circuit according to claim 1, wherein the first supply voltage and the second supply voltage are independent of a supply voltage for remaining circuits of the memory cell.

4. A driver circuit, comprising:
a memory cell for storing data for driving an element, the memory cell being formed of a first inverter having a first output terminal and a first input terminal and a second inverter having a second output terminal and a second input terminal, the first output terminal being connected to the second input terminal and the second output terminal being connected to the first input terminal;
a switch connected to the first input terminal, the data being fed to the memory cell through the switch; and
a supply voltage controller for supplying a first supply voltage to the first inverter and second inverter while the data is being written into the memory cell and a second supply voltage to the first inverter and second inverter after the data has been written into the memory cell,
wherein the memory cell is one of a plurality of memory cells;
wherein the driver circuit further comprises a data feeding circuit for feeding the data to the plurality of corresponding memory cells;
wherein the switch includes a first switch element and a plurality of second switch elements, the first switch element and each second switch element being connected in series between the data feeding circuit and a corresponding memory cell.

5. A driver circuit, comprising:
a memory cell for storing data for driving an element, the memory cell being formed of a first inverter having a first output terminal and a first input terminal and a second inverter having a second output terminal and a second input terminal, the first output terminal being connected to the second input terminal and the second output terminal being connected to the first input terminal;

a switch connected to the first input terminal, the data being fed to the memory cell through the switch; and a supply voltage controller for supplying a first supply voltage to the first inverter and second inverter while the data is being written into the memory cell and a second supply voltage to the first inverter and second inverter after the data has been written into the memory cell;

wherein the memory cell is one of a plurality of memory cells;

wherein the driver circuit further comprises:

a first data feeding circuit for feeding a first item of data to the plurality of memory cells;

a second data feeding circuit for feeding a second item of data to a corresponding memory cell, the second item of data and the first item of data having opposite logic levels;

a first switch element;

a plurality of second switch elements, the first switch element and each second switch element being connected in series between the first data feeding circuit and the first input terminal of a corresponding memory cell;

a third switch element; and a plurality of fourth switch elements, the third switch element and each fourth switch element being connected in series between the second data feeding circuit and the second input terminal of the corresponding memory cell.

6. The driver circuit according to claim 1, wherein the switch is formed of a transistor.

7. The driver circuit according to claim 5, wherein the first switch element, the third switch element, the plurality of second switch elements, and the plurality of fourth switch elements are formed of a transistor.

8. The driver circuit according to claim 1 incorporated in an image forming apparatus.

9. The driver circuit according to claim 4 incorporated in an image forming apparatus.

10. The driver circuit according to claim 5 incorporated in an image forming apparatus.

11. The driver circuit according to claim 2, wherein the first supply voltage and the second supply voltage are independent of a supply voltage for remaining circuits of the memory cell.

12. The driver circuit according to claim 1, wherein the element is a light emitting element and the data is correction data for correcting variation in light output of the light emitting element.

* * * * *